US011610078B2

(12) United States Patent
Goel et al.

(10) Patent No.: US 11,610,078 B2
(45) Date of Patent: *Mar. 21, 2023

(54) LOW VARIANCE REGION DETECTION FOR IMPROVED HIGH VARIANCE REGION DETECTION USING MACHINE LEARNING

(71) Applicant: Zoox, Inc., Foster City, CA (US)

(72) Inventors: Kratarth Goel, Albany, CA (US); James William Vaisey Philbin, Palo Alto, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/706,608

(22) Filed: Dec. 6, 2019

(65) Prior Publication Data

US 2020/0410281 A1 Dec. 31, 2020

Related U.S. Application Data

(63) Continuation-in-part of application No. 16/457,524, filed on Jun. 28, 2019, now Pat. No. 11,163,990.

(Continued)

(51) Int. Cl.
*G06K 9/62* (2022.01)
*G06V 40/10* (2022.01)
*G06N 20/00* (2019.01)
*G06N 3/04* (2023.01)
*G06V 20/58* (2022.01)
*G06V 40/16* (2022.01)

(52) U.S. Cl.
CPC .......... *G06K 9/623* (2013.01); *G06K 9/6221* (2013.01); *G06N 3/0454* (2013.01); *G06N 20/00* (2019.01); *G06V 20/58* (2022.01); *G06V 40/103* (2022.01); *G06V 40/161* (2022.01)

(58) Field of Classification Search
None
See application file for complete search history.

(56) References Cited

U.S. PATENT DOCUMENTS

| 7,130,448 B2* | 10/2006 | Nagaoka | G06V 20/58 |
| | | | 348/148 |
| 7,787,656 B2* | 8/2010 | Chen | G07C 9/00 |
| | | | 382/103 |

(Continued)

OTHER PUBLICATIONS

Kefi-Fatteh, Takoua, et al. "Human face detection improvement using incremental learning based on low variance directions." Signal, Image and Video Processing 13.8 (published May 2019): 1503-1510 (Year: 2019).*

(Continued)

*Primary Examiner* — Tahmina N Ansari
(74) *Attorney, Agent, or Firm* — Lee & Hayes, P.C.

(57) ABSTRACT

Using detection of low variance regions for improving detection is described. In an example, sensor data can be received from a sensor associated with a vehicle. The sensor data can represent an environment. An indication of a low variance region associated with the sensor data can be determined and an indication of a high variance region associated with the sensor data can be determined based at least in part on the indication of the low variance region. The vehicle can be controlled based on at least one of the sensor data or the indication of the high variance region.

20 Claims, 13 Drawing Sheets

Related U.S. Application Data

(60) Provisional application No. 62/925,698, filed on Oct. 24, 2019.

(56) References Cited

U.S. PATENT DOCUMENTS

| | | | | |
|---|---|---|---|---|
| 8,175,335 | B2* | 5/2012 | Zhang | G06K 9/00 382/103 |
| 9,612,123 | B1* | 4/2017 | Levinson | B60W 30/09 |
| 10,353,390 | B2 | 7/2019 | Linscott et al. | |
| 10,817,740 | B2* | 10/2020 | Tariq | G06K 9/627 |
| 2009/0143987 | A1* | 6/2009 | Bect | B60R 21/0134 701/300 |
| 2010/0321513 | A1* | 12/2010 | Zhang | G06K 9/00 348/222.1 |
| 2011/0255741 | A1* | 10/2011 | Jung | G06K 9/00369 382/103 |
| 2013/0051613 | A1* | 2/2013 | Bobbitt | G06K 9/00771 382/103 |
| 2013/0315458 | A1* | 11/2013 | Beymer | G06K 9/6269 382/130 |
| 2018/0158189 | A1* | 6/2018 | Yedla | G06K 9/4628 |
| 2018/0251126 | A1* | 9/2018 | Linscott | G05D 1/0055 |
| 2019/0049242 | A1 | 2/2019 | Adams et al. | |
| 2019/0049566 | A1 | 2/2019 | Adams et al. | |
| 2019/0187718 | A1* | 6/2019 | Zou | G06K 9/6274 |
| 2020/0309957 | A1* | 10/2020 | Bhaskaran | G01S 17/42 |
| 2020/0410224 | A1 | 12/2020 | Goel | |
| 2020/0410225 | A1* | 12/2020 | Goel | G06F 17/18 |
| 2020/0410281 | A1* | 12/2020 | Goel | G06K 9/00228 |

OTHER PUBLICATIONS

Non Final Office Action dated Nov. 27, 2020 for U.S. Appl. No. 16/457,524, "Head Detection for Improved Pedestrian Detection", Goel, 23 pages.

Office Action for U.S. Appl. No. 16/706,623, dated Mar. 18, 2021, Goel, "Low Variance Detection Training", 26 pages.

Styles, et al., "Forecasting Pedestrian Trajectory with Machine-Annotated Training Data", 2019 IEEE, Intelligent Vehicles Symposium (IV), 6 pages.

Lin Chih-Yang et al: "PedJointNet: Joint Head-Shoulder and Full Body Deep Network for Pedestrian Detection", IEEE Access, vol. 7, pp. 47687-47697, XP011720316, DOI: 10.1109/ACCESS.2019.2910201 [retrieved on Apr. 19, 2019].

Mohan A et al: "Example-Based Object Detection in Images by Components", IEEE Transactions on Pattern Analysis and Machine Intelligence, IEEE Computer Society, USA, vol. 23, No. 4, Apr. 1, 2001 (Apr. 1, 2001), pp. 349-361, XP001110301, ISSN: 0162-8828, DOI: 10.1109/34.917571.

Wanli Ouyang et al: "A discriminative deep model for pedestrian detection with occlusion handling", Computer Vision and Pattern Recognition (CVPR), 2012 IEEE Conference on, IEEE, Jun. 16, 2012 (Jun. 16, 2012), pp. 3258-3265, XP032232461, DOI: 10.1109/CVPR.2012.6248062 ISBN: 978-1-4673-1226-4.

The International Report on Preliminary Patentability for PCT Application No. PCT/US20/39402, dated Jan. 6, 2022.

* cited by examiner

LOW VARIANCE REGION DETECTION FOR IMPROVED HIGH VARIANCE REGION DETECTION USING MACHINE LEARNING

PRIORITY

This application claims priority to U.S. Provisional Patent Application No. 62/925,698, filed on Oct. 24, 2019, the entire contents of which are incorporated by reference herein. Furthermore, this application claims priority to, and is a continuation-in-part of U.S. patent application Ser. No. 16/457,524, filed on Jun. 28, 2019, the entire contents of which are incorporated by reference herein.

BACKGROUND

An autonomous vehicle often includes a perception system to capture sensor data of an environment. The perception system allows the autonomous vehicle to recognize objects in the environment so that the autonomous vehicle can plan a safe route through the environment. The safe operation of an autonomous vehicle depends, at least in part, on information made available by the perception system in detecting, classifying, and predicting motion of objects. Thus, inaccurate and/or incomplete information provided by such detection, classification, and/or prediction of objects can reduce the safety with which autonomous vehicles can operate.

The perception system can utilize computer vision techniques for recognizing objects in the environment. Computer vision techniques enable computers to analyze image data to understand the content of the image data. Examples of computer vision techniques include object classification, object identification, object verification, object detection, object landmark detection, object segmentation, object recognition, and so on. When solving computer vision problems, there is a significant amount of variance which can affect the accuracy of computer vision solutions. That is, one long standing issue with computer vision, and more broadly with the field of deep learning, is to be able to solve for the long tail of the data distribution. As noted above, this can be problematic for perception systems onboard autonomous vehicles, as well as for other uses of computer vision techniques.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
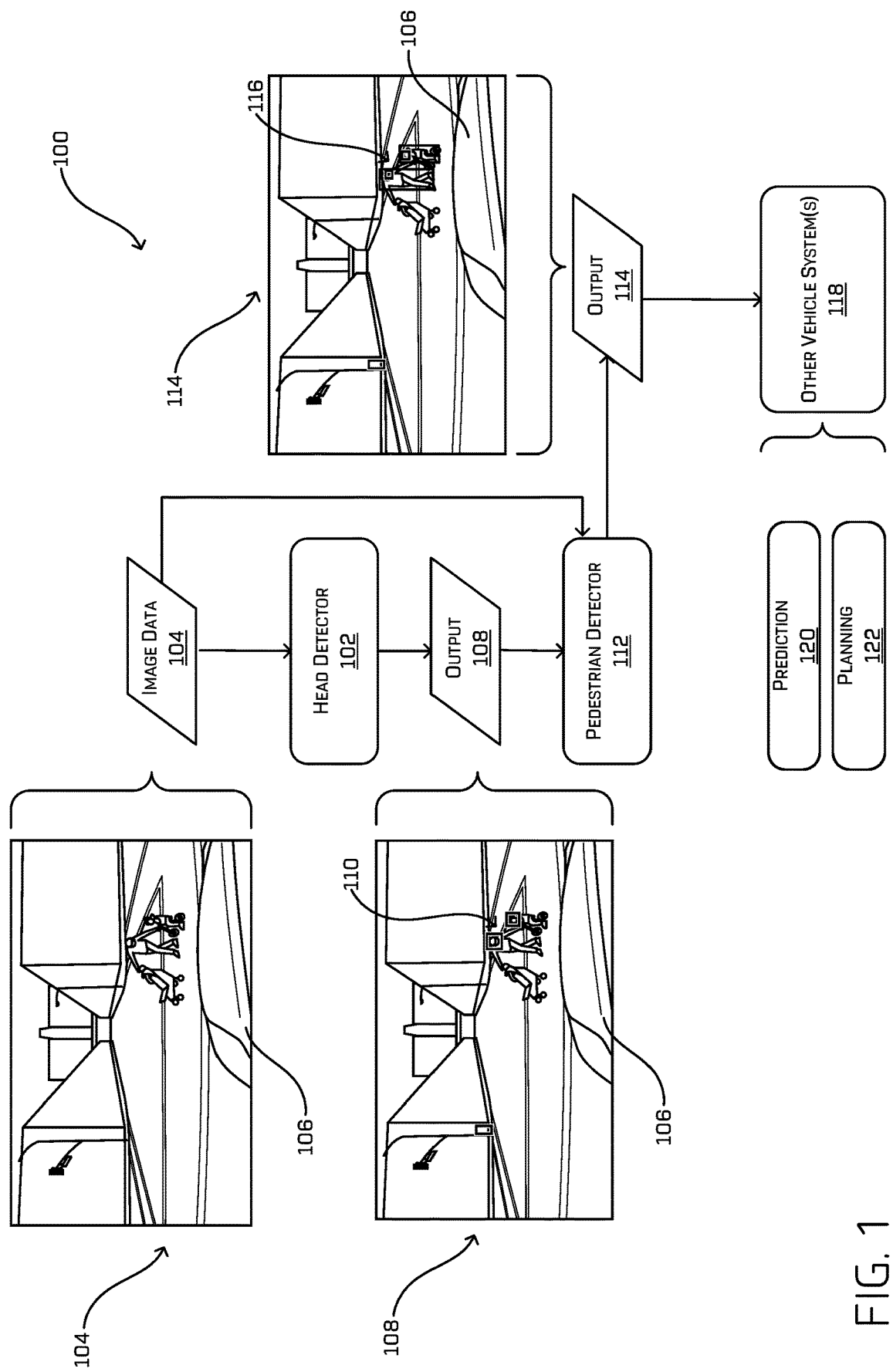
FIG. 1 illustrates an example process for performing techniques described herein.

Techniques described herein relate to using low variance region, or sub-region, detection for improving detection, such as high variance region detection. In an example, image data associated with an environment within which a vehicle is positioned can be analyzed using a machine learned algorithm to detect a low variance region. A low variance region can be a collection of points forming a multi-dimensional object, or portion thereof, wherein variance between multiple instances of the multi-dimensional object is below a threshold. Based at least partly on detecting the low variance region associated with the image data, a high variance region can be determined to be present in the environment. A high variance region can be a collection of points forming a multi-dimensional object, or portion thereof, wherein variance between multiple instances of the multi-dimensional object meets or exceeds a threshold. That is, techniques described herein relate to using a sub-region of a high variance region to detect the high variance region in the image data. A region of interest corresponding to the high variance region can be identified in the image data and a bounding box can be associated with the region of interest in the image data. That is, the bounding box can be used to identify a position and/or extent of the high variance region in the environment. The image data, including the bounding box, can be provided to a system of the vehicle for making determinations with respect to controlling the vehicle. For instance, an indication of the high variance region can be provided to a planning system or a prediction system associated with the vehicle to control the vehicle within the environment.

In one example, a low variance region that may correspond to a head of a person. In such an example, a head can be used for improving detection of a high variance region, which can be a pedestrian. Techniques described herein are directed to using head detection for improving pedestrian detection. In an example, image data associated with an environment within which a vehicle is positioned can be analyzed using a machine learned algorithm to detect a head, or any portion thereof (e.g., a front view of a face, a side view of a face, a portion of a face, a back view of a head, etc.). Based at least partly on detecting the head in the image data, a pedestrian can be determined to be present in the environment. A region of interest corresponding to the pedestrian can be identified in the image data and a bounding box can be associated with the region of interest in the image data. That is, the bounding box can be used to identify a position and/or extent of the pedestrian in the environment. The image data, including the bounding box, can be provided to a system of the vehicle for making determinations with respect to controlling the vehicle. For instance, an indication of the pedestrian can be provided to a planning system or a prediction system associated with the vehicle to control the vehicle within the environment.

Additional and alternative examples can be imagined. For example, a low variance region can correspond to headlights of a vehicle and detection of such headlights can be used to improve detection of a high variance region, such as a vehicle (e.g., particularly at night or in low light). Furthermore, a low variance region can correspond to a wheel of a vehicle and detection of such a wheel can be used to improve detection of a high variance region, such as a vehicle. As another example, a low variance region can correspond to a door of a house and detection of such a door can be used to improve detection of a high variance region, such as a house. In some examples, low variance and high variance correspondence can be learned by machine learning techniques. In some examples, low variance and high variance correspondence can be explicit (e.g., by pre-informing network(s) of such correspondence). In some examples, machine trained models can be trained to detect low variance features, which can serve as proxies for high variance regions, without explicitly modelling low variance outputs. Where described in some examples herein as a low variance detection (or region) informing a high variance detection, such examples are meant to be inclusive of multiple networks (e.g., in which a low variance network output is used to provide additional context to a high variance detector network), single networks trained to determine regions of low variance (e.g., having losses associated therewith which are based at least in part on variance in the input region) and couple to regions of general detections (e.g., by coupling detection losses with variance-based losses), and/or any combination thereof, etc.

Object detection is a computer vision technique for identifying objects (e.g., pedestrians, cyclists, vehicles, animals, etc.) in image data. Object classification is a computer vision technique for classifying identified objects in image data. In some examples, a computing system onboard a vehicle (e.g., a perception system) can identify and/or classify objects in image data associated with an environment within which the vehicle is positioned, for example, for determining how to control the vehicle. In at least one example, a computing system onboard a vehicle can identify and/or classify other vehicles, cyclists, pedestrians, and the like in image data associated with an environment within which the vehicle is positioned to determine how the vehicle should navigate within the environment.

Some objects are associated with significant variance. Variance can refer to differences in input data. When multiple instances of an object (e.g., objects classified with a same bounding box), or a portion thereof, associated with input data (e.g., image data) are compared, a variance metric associated with the multiple instances of an object, or a portion thereof, that meets or exceeds a threshold, such objects, or portions thereof, can be associated with "high variance regions." Such a variance metric can represent the variance of information inside of a bounding box associated with an object, or portion thereof, in input data, batches of input data, or an entire input space. In some examples, the variance metric can be based on entropy, pixel intensity, aspect ratios between boxes, and the like. Detecting such high variance regions can be difficult because of the variance between multiple instances of such regions. That is, modeling high variance regions, for example, using neural networks, can be challenging due to the lack of priors that lend themselves to region learning. As such, current detection and/or classification techniques can be inaccurate (e.g., miss a detection or have a high uncertainty associated therewith). Furthermore, because high variance regions can be non-convex, modeling such high variance regions requires a significant amount of network energy, processing time, and/or other resources. Increased accuracy can be achieved by increasing the amount of data used for training machine learned algorithms to account for the variation described above. However, increasing the amount of data used for training machine learned algorithms can cause an increase in the amount of training required, and the amount of compute required to perform such training.

As an example, detecting and/or classifying pedestrians can be difficult because pedestrians can be associated with different heights, widths, etc., as well as lie in a variety of poses in an environment (e.g., laying down, working underneath a car, on a ladder, etc.). That is, there can be significant variation in pedestrians such that current detection and/or classification techniques can be inaccurate (e.g., miss a detection or have a high uncertainty associated therewith). Furthermore, variation in lighting, scale, rotation, occlusion, etc. can further cause current detection and/or classification techniques to be inaccurate. Increased accuracy can be achieved by increasing the amount of data used for training machine learned algorithms to account for the variation described above. However, increasing the amount of data used for training machine learned algorithms can cause an increase in the amount of training required, and the amount of compute required to perform such training.

As described above, techniques described herein relate to using low variance region detection for improving detections generally (which may include, for example, high variance-type detections). Low variance regions are "low variance" because when multiple instances of an object (e.g., objects classified with a same bounding box), or portion thereof, associated with input data (e.g., image data) are compared, a variance metric associated with the multiple instances of an object, or portion thereof, can be below a threshold. That is, low variance regions can be associated with a variance metric associated with the multiple instances of an object, or portion thereof, in input data, batches of input data, or an entire input space that is below a threshold. In some examples, a low variance region can be a sub-region of a high variance region. As an example, a region of image data associated with a face is associated with a low variance region and a region of image data associated with a pedestrian is associated with a high variance region. As another example, a region of image data associated with a door is associated with a low variance region and a region of image data associated with a house is associated with a high variance region.

Detecting low variance regions can be easier than detecting high variance regions because the variance between multiple instances of low variance regions is lower and thus requires less training and compute. That is, instead of trying to model high variance regions, techniques described herein attempt to solve the problem in a bottom up manner, wherein a sub-region/low variance region is detected first, and such a sub-region/low variance region can be used to detect a high variance region. By breaking up the problem (e.g., modeling high variance regions) into sub-parts, the variance in the sub-parts can be lower than the variance of the high variance regions, and the variance of the high variance regions can be in a disjointed set of parameters.

In an example, image data associated with an environment within which a vehicle is positioned can be analyzed using a machine learned algorithm to detect a low variance region. Based at least partly on detecting the low variance region associated with the image data, a high variance region can be determined to be present in the environment. In some examples, the low variance region can be detected in image data using a neural network. A neural network is a framework of machine learned models that work together to classify inputs (e.g., of image data) based on a previous training process. In some examples, a neural network classifies image data as either containing the low variance region or not, based upon the model being previously trained on a set of images having instances of the low variance region and not having instances of the low variance region.

As described above, the computing system can identify a region of interest corresponding to the high variance region in the image data and, in some examples, can associate a bounding box with the region of interest. In at least some examples, the region may be determined from the low variance region detection alone (e.g., by region proposals as described in detail herein). In additional or alternate examples, a low variance region detection network may be incorporated with one or other portions of a larger network (e.g., where low variance region detection is used as a feature input into another network trained to detect high variance regions), as a single network with different network low variance regions trained jointly with the low variance region detection network in which similar features are shared, and the like. The image data, which can include an indication of the region of interest corresponding to the high variance region (e.g., the bounding box), can be provided to a system of the computing system that makes determinations with respect to controlling the vehicle.

For instance, the image data, including the indication of the high variance region, can be provided to a planning system or a prediction system associated with the computing system to control the vehicle within the environment. In some such examples, training may be performed by a user specifying corresponding low variance features compared to high variance detections (e.g., training a face detector to inform a pedestrian detector). In other examples, such training may be performed by having such a model (e.g., neural network) learn proposed low variance features which should be associated with detections based on high variance input (e.g., incorporating losses based on input variance). In some examples, training may be performed by causing input images to be projected into feature spaces and subsequently projected back into image spaces, whereby a loss function can be used to enforce consistency between original input images and subsequently reconstructed images for modelling high variance regions end-to-end as an optimization problem. Additional details are described below.

Techniques described herein enable high variance regions to be detected with more accuracy than what is available with current techniques. That is, by breaking a problem into low variance components and high variance components, machine learned model(s) can provide more certain determinations and/or can provide determinations about data faster than what is available with current techniques. That is, instead of using training data that includes significant variations of high variance regions and/or environmental conditions, techniques described herein can streamline computer vision techniques by using machine learning techniques to determine the presence of high variance regions in image data. That is, techniques described herein improve computer vision techniques and/or technologies by increasing the accuracy at which computer vision systems can determine the presence of high variance regions without requiring increases in training data and computer resources.

As an example, techniques described herein relate to using head detection for improving pedestrian detection. As used herein, "head detection," can refer to the use of facial detection techniques for detecting heads and/or faces, or portions thereof, in image data. Facial detection is a computer vision technique for identifying human faces in image data. This technology has several different uses, which can include tagging pictures in social networking sites to biometrics and healthcare to security access control. In some examples, human faces can be detected in image data using neural networks. A neural network is a framework of machine learned models that work together to classify inputs (e.g., of image data) based on a previous training process. In some examples, a neural network classifies image data as either containing a human face or not, based upon the model being previously trained on a set of facial and non-facial images. Examples of facial recognition models include, but are not limited to, FaceMatch, Face Everything, Fisherfaces, DeepID Test, Tensorflow, OpenFace, TinyFaces, etc.

In an example, a computing system (e.g., a perception system) onboard a vehicle can receive image data of an environment within which the vehicle is positioned. The computing system can analyze the image data using facial detection techniques described above to identify a head in the environment. Responsive to detecting a head in the image data, the computing system onboard a vehicle can determine that a pedestrian is present in the environment. As described above, the computing system can identify a region of interest corresponding to the pedestrian in the image data and, in some examples, can associate a bounding box with the region of interest. In at least some examples, the region may be determined from the head detection alone (e.g., by region proposals as described in detail herein). In additional or alternate examples, a head detection network may be incorporated with one or other portions of a larger network (e.g., where head detection is used as a feature input into another network trained to detect pedestrians), as a single network with different network heads trained jointly with the head detection network in which similar features are shared, and the like. The image data, which can include an indication of the region of interest corresponding to the pedestrian (e.g., the bounding box), can be provided to a system of the computing system that makes determinations with respect to controlling the vehicle. For instance, the image data, including the indication of the pedestrian, can be provided to a planning system or a prediction system associated with the computing system to control the vehicle within the environment. Additional details are described below.

Techniques described herein enable pedestrians to be detected with more accuracy than what is available with current techniques. That is, by using head detection to determine that pedestrians are present in image data, techniques described herein can determine pedestrians are present despite variations of pedestrian heights, widths, poses (relative positions and orientations of arms, legs, torso, etc.), and so on. Instead of using training data that includes significant variations of pedestrians and/or environmental conditions, techniques described herein can streamline computer vision techniques by using facial recognition techniques to determine the presence of pedestrians in image data. That is, techniques described herein improve computer vision techniques and/or technologies by increasing the accuracy at which computer vision systems can determine the presence of pedestrians without requiring increases in training data and computer resources.

While techniques described above are directed to the detection of pedestrians, techniques described herein may be applied to any number of types of objects (e.g., animals, cyclists, etc.). That is, techniques described herein should not be construed as being limited to the detection of pedestrians using head detection. As described above, techniques described above can be applicable for any regions (e.g., collections of points forming a multi-dimensional object, or portion thereof) wherein a low variance region can be used to improve detection of a high variance region.

Furthermore, while techniques described above are directed to detecting low variance regions and high variance regions in image data, techniques described herein can be applicable to any type of input data (e.g., LIDAR data, RADAR data, audio sensor data, thermal sensor data, pressure sensor data, etc.), which may or may not be within the domain of autonomous vehicles.

The techniques described herein can be implemented in a number of ways. Example implementations are provided below with reference to the following figures. Example implementations are discussed in the context of autonomous vehicles; however, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. In some examples, the techniques can be utilized in contexts outside of autonomous vehicles and/or perception systems. That is, in some examples, techniques described herein can be applicable to weather data, financial data, etc. Furthermore, the techniques described herein can be used with real data (e.g., captured using sensor(s)), simulated data (e.g., generated by a simulator), or any combination of the two.

Figure 8:
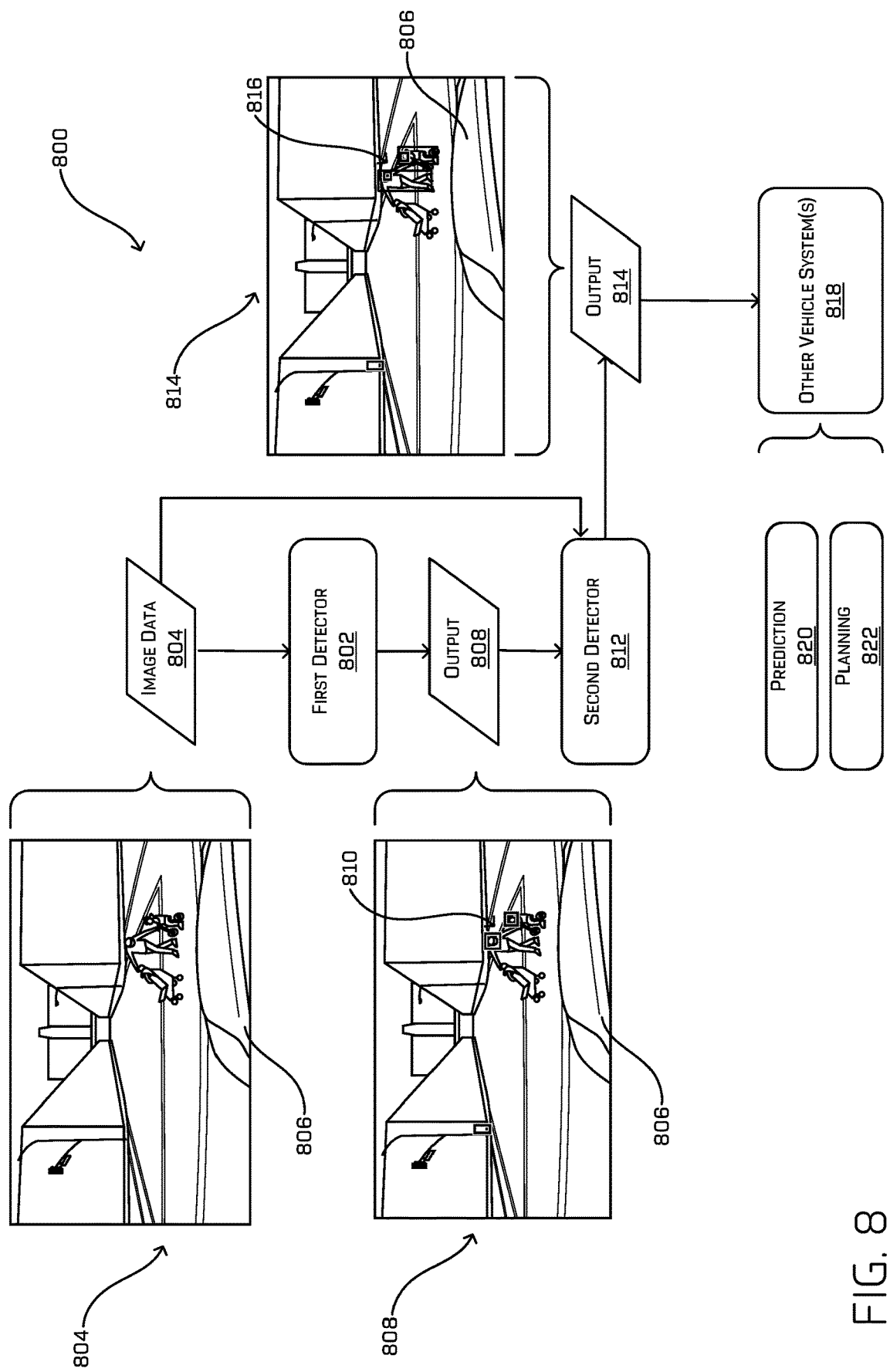
FIG. 8 illustrates an example process for performing techniques described herein.

FIG. 8 illustrates an example process 800 for performing techniques described herein. In FIG. 8, a first detector 802, which can detect low variance regions and can be associated with a perception system as described below, can receive sensor data, such as image data 804. The image data 804 can include one or more frames of images of an environment within which a vehicle 806 is positioned. In at least one example, the first detector 802 (and the perception system) can be onboard the vehicle 806. In at least one example, the vehicle 806 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 806 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 806 is an autonomous vehicle; however, the vehicle 806 could be any other type of vehicle.

Figure 2A:
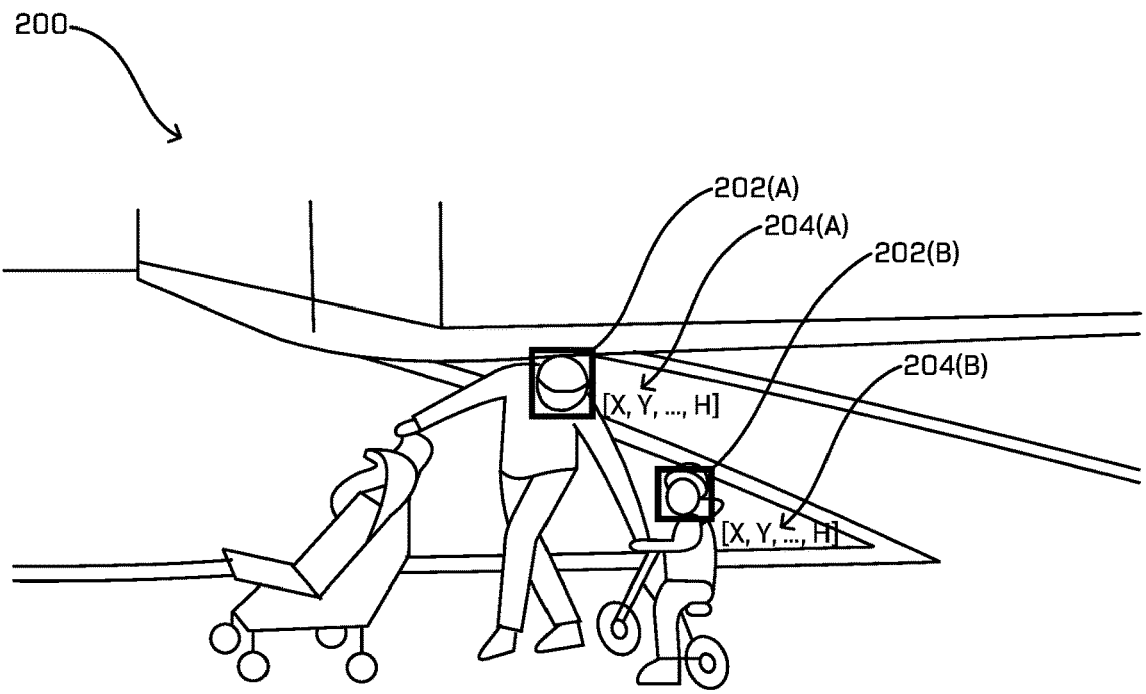
FIG. 2A illustrates details associated with an output of a head detection process.

In at least one example, the first detector 802 can receive the image data 804 and can analyze the image data 804 using a machine learned model. As described above, in at least one example, the first detector 802 can be part of a computing system onboard the vehicle 806 that can utilize a neural network for detecting low variance region(s) in the image data 804. However, in additional or alternative examples, the first detector 802 can use any other type of machine learned model, as described below with reference to FIG. 3. The first detector 802 can generate an output 808 based at least in part on analyzing the image data 804 with the machine learned model. In at least one example, the output 808 can include the image data 804 with one or more indications 880 of whether a low variance region was detected by the first detector 802. In some examples, the indication(s) 880 can be bounding box(es) that surround region(s) of interest corresponding to low variance region(s) in the image data 804 and/or corresponding certainty information. In other examples, any other type of indication can be used to indicate whether a low variance region was detected by the first detector 802. In at least one example, the indication(s) 810 can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a low variance region was detected (e.g., a binary indication (i.e., low variance region detected (H) or not (N)), a probability, etc.), etc. In some examples, the information can be used to generate the bounding box(es) and/or other indications. Additional details are illustrated in FIG. 2A.

In some examples, the first detector 802 can be associated with a multi-class classifier, which can analyze the image data 804 and output a plurality of classifications with corresponding certainty information (e.g., probability of a detected object corresponding to a particular classification). In such an example, a machine learned model can be trained to classify low variance regions into classifications such as a low variance region of a first class, a low variance region of a second class, a low variance region of a third class, etc. Such classifications and/or corresponding certainty information can be useful for determining indications of low variance regions, as described herein. As described below with reference to FIG. 3, such classifications can be provided to the networks (e.g., to establish a relationship between the low variance region and each class) or the networks can learn the relationship between the low variance region and each class (e.g., using end-to-end training).

In at least one example, the output 808 of the first detector 802 can be input into a second detector 812. The second detector 812 can be trained to detect regions (e.g., objects) in the image data. In at least one example, detection of high variance regions by the second detector 812 can be improved based at least in part on the output 808 (e.g., information associated with the low variance output). In at least one example, the second detector 812 can determine that a high variance region is present in the environment within which the vehicle 806 is presented and/or information associated with the high variance region. That is, the second detector 812 can analyze the output 808 and can determine that a high variance region is present in the environment within which the vehicle 806 is presented and/or information associated with the high variance region. In at least one example, the second detector 812 can be associated with a perception system of the vehicle 806, as described below. In some examples, the second detector 812 can use one or more statistical models to determine that a high variance region is present in an environment (e.g., based on a size and/or position of the bounding box of the output 808, estimating (based on a statistical likelihood) a proposed region for a high variance region in the image) (or not). In additional or alternative examples, the second detector 812 can use one or more machine learned models, which can analyze the output 808 and, in some examples, additional data as described below, to determine that a high variance region is present in an environment (or not). In some examples, the image data 804 can be input directly into the second detector 812 in addition to the first detector 802. Additional details are described below with reference to FIGS. 9-12. Regardless, such a second detector 812 may utilize information provided by the first detector 802 in order to better inform such detections (whether high variance or not). In any such examples, such a detector may be trained independently (e.g., from the first detector 802, and, in some examples, pre-informed of relationships between low variance regions and high variance regions) and/or end-to-end. When trained end-to-end, such training may enforce the coupling between low variance regions which inform the ultimate output. In some examples, training such a first detector 802 may comprise evaluating and back-propagating based at least in part on a loss function which determines a measure of the variance of an associated region in the input space.

Figure 2B:
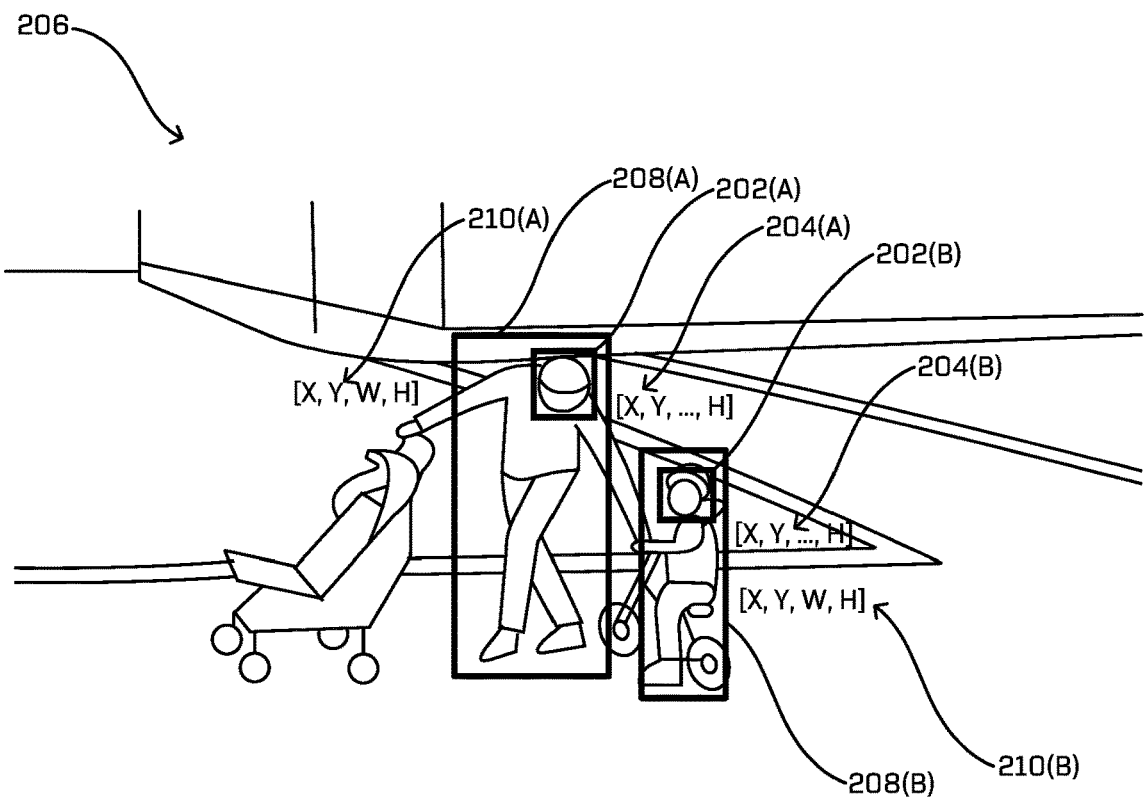
FIG. 2B illustrates details associated with an output of a pedestrian detection process.

The second detector 812 can generate an output 814 that is based at least partly on the output 808. In at least one example, the output 814 of the second detector 812 can include one or more indications 816 that are associated with regions of interest corresponding to identified high variance region(s) in the environment within which the vehicle 806 is positioned. In some examples, the indication(s) 816 can be bounding box(es) that surround region(s) of interest corresponding to high variance region(s) in the image data 804. In other examples, any other type of indication can be used to indicate that a high variance region was detected in the environment by the second detector 812. In at least one example, the indication(s) 816 can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc. In some examples, the information can be used to generate the bounding box(es) and/or other indications. Additional details are illustrated in FIG. 2B. In some such examples, a user may manually specify classes and subclasses for coupling the two detectors (e.g., wherein the first detector 802 is a face detector and the second detector 812 is a pedestrian detector).

In at least one example, the output 814 can be provided to other vehicle system(s) 818 of the computing system onboard the vehicle 806. Such system(s) can include a prediction system 820, a planning system 822, and so on. Additional systems are described below with reference to FIG. 3. In at least one example, the output 814 can be provided to the other vehicle system(s) 818 for making determinations with respect to controlling the vehicle 806, for instance, for determining a trajectory along which the vehicle 806 is to drive and causing the vehicle 806 to drive along the trajectory. In some examples, the output 814 can be used by the prediction system 820 for predicting how an object in an environment may move in the future. In additional or alternative examples, the output 814 can be used by the planning system 822 to determine a trajectory along which the vehicle 806 is to travel. Additional details associated with the prediction system 820 and the planning system 822 are described below with reference to FIG. 3.

FIG. 1 illustrates an example process 100 for performing techniques described herein. FIG. 1 is similar to FIG. 8 but describes a particular application of techniques described above in FIG. 8. In FIG. 1, a head detector 102, which can be associated with a perception system as described below, can receive sensor data, such as image data 104. The image data 104 can include one or more frames of images of an environment within which a vehicle 106 is positioned. In at least one example, the head detector 102 (and the perception system) can be onboard the vehicle 106. In at least one example, the vehicle 106 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 106 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 106 is an autonomous vehicle; however, the vehicle 106 could be any other type of vehicle.

In at least one example, the head detector 102 can receive the image data 104 and can analyze the image data 104 using a machine learned model. As described above, in at least one example, the head detector 102 can be part of a computing system onboard the vehicle 106 that can utilize a neural network for detecting head(s) in the image data 104. However, in additional or alternative examples, the head detector 102 can use any other type of machine learned model, as described below. Examples of machine learned models that can be used by the head detector 102 include, but are not limited to, FaceMatch, Face Everything, Fisherfaces, DeepID Test, Tensorflow, OpenFace, TinyFaces, etc. The head detector 102 can generate an output 108 based at least in part on analyzing the image data 104 with the machine learned model. In at least one example, the output 108 can include the image data 104 with one or more indications 110 of whether a head was detected by the head detector 102. In some examples, the indication(s) 110 can be bounding box(es) that surround region(s) of interest corresponding to head(s) in the image data 104 and/or corresponding certainty information. In other examples, any other type of indication can be used to indicate whether a head was detected by the head detector 102. In at least one example, the indication(s) 110 can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a head was detected (e.g., a binary indication (i.e., head detected (H) or not (N)), a probability, etc.), etc.

In some examples, the information can be used to generate the bounding box(es) and/or other indications. Additional details are illustrated in FIG. 2A.

In some examples, the head detector 102 can be associated with a multi-class classifier, which can analyze the image data 104 and output a plurality of classifications with corresponding certainty information (e.g., probability of a detected object corresponding to a particular classification). In such an example, a machine learned model can be trained to classify heads into classifications such as a head of a pedestrian, a head of a cyclist, a head on a billboard, etc. Such classifications and/or corresponding certainty information can be useful for determining indications of heads, as described herein.

In at least one example, the output 108 of the head detector 102 can be input into a pedestrian detector 112, which can determine whether a pedestrian is present in the environment within which the vehicle 106 is presented and/or information associated with the pedestrian. That is, the pedestrian detector 112 can analyze the output 108 to determine whether a pedestrian is present in the environment within which the vehicle 106 is presented and/or information associated with the pedestrian. In at least one example, the pedestrian detector 112 can be associated with a perception system of the vehicle 106, as described below. In some examples, the pedestrian detector 112 can use one or more statistical models to determine whether a pedestrian is present in an environment (e.g., based on a size and/or position of the bounding box of the output 108, estimating (based on a statistical likelihood) a proposed region for a pedestrian in the image). In additional or alternative examples, the pedestrian detector 112 can use one or more machine learned models, which can analyze the output 108 and, in some examples, additional data as described below, to determine whether a pedestrian is present in an environment. In some examples, the image data 104 can be input directly into the pedestrian detector 112 in addition to the head detector 102. Additional details are described below with reference to FIGS. 4-7.

The pedestrian detector 112 can generate an output 114 that is based at least partly on the output 108. In at least one example, the output 114 of the pedestrian detector 112 can include one or more indications 116 that are associated with regions of interest corresponding to identified pedestrian(s) in the environment within which the vehicle 106 is positioned. In some examples, the indication(s) 116 can be bounding box(es) that surround region(s) of interest corresponding to pedestrian(s) in the image data 104. In other examples, any other type of indication can be used to indicate that a pedestrian was detected in the environment by the pedestrian detector 112. In at least one example, the indication(s) 116 can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc. In some examples, the information can be used to generate the bounding box(es) and/or other indications. Additional details are illustrated in FIG. 2B.

In at least one example, the output 114 can be provided to other vehicle system(s) 118 of the computing system onboard the vehicle 106. Such system(s) can include a prediction system 120, a planning system 122, and so on. Additional systems are described below with reference to FIG. 3. In at least one example, the output 114 can be provided to the other vehicle system(s) 118 for making determinations with respect to controlling the vehicle 106, for instance, for determining a trajectory along which the vehicle 106 is to drive and causing the vehicle 106 to drive along the trajectory. In some examples, the output 114 can be used by the prediction system 120 for predicting how an object in an environment may move in the future. In additional or alternative examples, the output 114 can be used by the planning system 122 to determine a trajectory along which the vehicle 106 is to travel. Additional details associated with the prediction system 120 and the planning system 122 are described below with reference to FIG. 3.

FIGS. 2A and 2B illustrate additional details associated with the outputs 108 and 114, respectively.

FIG. 2A illustrates additional details associated with an output of a head detection process. That is, FIG. 2A illustrates additional details associated with the output 108 in FIG. 1. As described above, the head detector 102 can generate an output 108 based at least in part on analyzing the image data 104 with the machine learned model. In at least one example, the output 108 can include the image data 104 with one or more indications 110 of whether a head was detected by the head detector 102. The portion 200 of the output 108 illustrated in FIG. 2A illustrates a first indication 202(A) associated with a first head and a second indication 202(B) associated with a second head (collectively, indication(s) 202). In some examples, the indication(s) 202 can be bounding box(es) that surround region(s) of interest corresponding to head(s) in the image data 104 and/or corresponding certainty information. In other examples, any other type of indication can be used to indicate whether a head was detected by the head detector 102. In at least one example, the indication(s) 202 can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a head was detected (e.g., a binary indication (i.e., head detected (H) or not (N)), a probability, etc.), etc. In FIG. 2A, the information 204(A) and 204(B) is illustrated as being displayed proximate to the respective indication(s) 202.

FIG. 2B illustrates additional details associated with an output of a pedestrian detection process. That is, FIG. 2B illustrates additional details associated with the output 114 in FIG. 1. As described above, the pedestrian detector 112 can generate an output 114. In at least one example, the output 114 of the pedestrian detector 112 can include one or more indicators 116 that are associated with regions of interest corresponding to identified pedestrian(s) in the environment within which the vehicle 106 is positioned. The portion 206 of the output 114 illustrated in FIG. 2B illustrates a third indication 208(A) associated with a first pedestrian and a fourth indication 208(B) associated with a second pedestrian (collectively, indication(s) 208). In some examples, the indication(s) 208 can be bounding box(es) that surround region(s) of interest corresponding to pedestrian(s) in the image data 104. In other examples, any other type of indication can be used to indicate that a pedestrian was determined to be present in the environment by the pedestrian detector 112. In at least one example, the indication(s) 208 can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc., as well as any certainties associated therewith. In FIG. 2B, the information 210(A) and 210(B) is illustrated as being displayed proximate to the indication(s) 208.

FIG. 2B additionally includes the indication(s) 202 output via the head detector 102 and the information 204(A) and 204(B) associated therewith. That is, FIG. 2B illustrates that the output 114 includes both the indication(s) 202 and the indication(s) 208, as well as the information 204(A), 204(B), 210(A), and 210(B) associated with each. In an alternative example, the indication(s) 202 and/or associated information 204(A) and 204(B) can be omitted.

As described above, techniques described herein enable pedestrians to be detected with more accuracy than what is available with current techniques. Conventional object detection techniques may not have identified the pedestrian in the image data 104 due to the pedestrian's positioning and/or the additional objects surrounding the pedestrian (e.g., the stroller and the child on the bike). Further, the child on the bike may be identified as a cyclist. However, by using head detection to determine that pedestrians are present in image data, techniques described herein can determine pedestrians are present despite variations and/or oddities described above.

Figure 3:
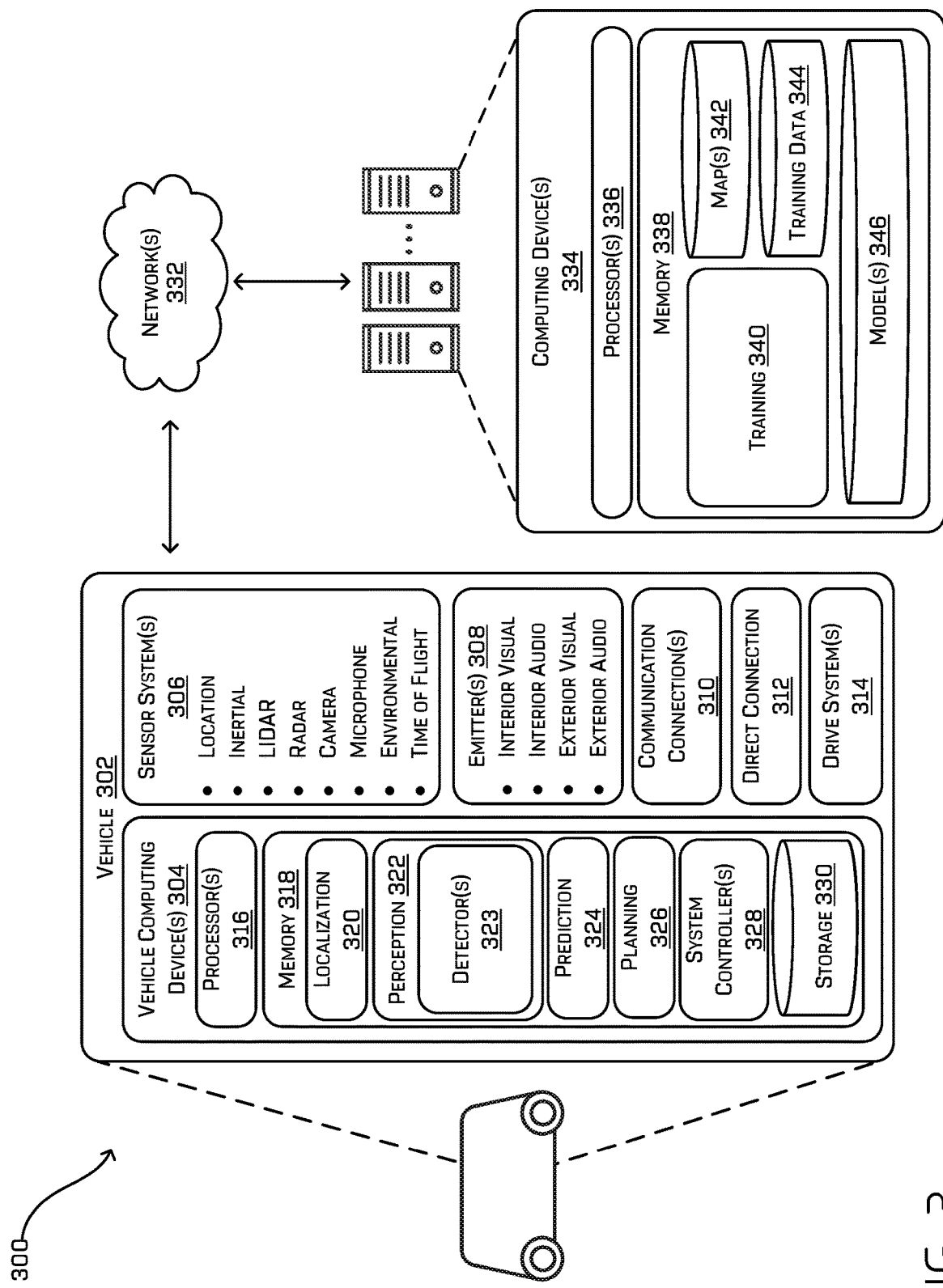
FIG. 3 is a block diagram illustrating an example system for performing techniques described herein.

FIG. 3 is a block diagram illustrating an example system 300 for performing techniques described herein. In at least one example, a vehicle 302 can include one or more vehicle computing devices 304, one or more sensor systems 306, one or more emitters 308, one or more communication connections 310, at least one direct connection 312, and one or more drive systems 314. As described above, the vehicle 302 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 302 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 302 is an autonomous vehicle; however, the vehicle 302 could be any other type of vehicle.

The vehicle computing device(s) 304 can include processor(s) 316 and memory 318 communicatively coupled with the processor(s) 316. In the illustrated example, the memory 318 of the vehicle computing device(s) 304 stores a localization system 320, a perception system 322, a prediction system 324, a planning system 326, and one or more system controllers 328. Additionally, the memory 318 can include a storage 330, which can store map(s), model(s), etc. A map can be any number of data structures modeled in two dimensions, three dimensions, or N dimensions that are capable of providing information about an environment, such as, but not limited to, topologies (such as intersections), streets, mountain ranges, roads, terrain, and the environment in general. Maps can be associated with real environments or simulated environments. Model(s) can include machine-trained models, as described below.

In at least one example, the localization system 320 can determine a pose (position and orientation) of the vehicle 302 in relation to a local and/or global map based at least in part on sensor data received from the sensor system(s) 306 and/or map data associated with a map (e.g., of the map(s)). In at least one example, the localization system 320 can include, or be associated with a calibration system that is capable of performing operations for calibrating (determining various intrinsic and extrinsic parameters associated with any one or more of the sensor system(s) 306), localizing, and mapping substantially simultaneously. Additional details associated with such a system are described in U.S. patent application Ser. No. 15/675,487, filed on Aug. 11, 2017, which is related to U.S. patent application Ser. No. 15/674,853, filed on Aug. 11, 2017, the entire contents of both of which are incorporated by reference herein.

In at least one example, the perception system 322 can perform object detection, segmentation, and/or classification based at least in part on sensor data received from the sensor system(s) 306. In at least one example, the perception system 322 can receive raw sensor data (e.g., from the sensor system(s) 306). In at least one example, the perception system 322 can receive image data and can utilize one or more image processing algorithms to perform object detection, segmentation, and/or classification with respect to object(s) identified in the image data. In some examples, the perception system 322 can associate a bounding box (or otherwise an instance segmentation) with an identified object and can associate a confidence score associated with a classification of the identified object with the identified object. In some examples, objects, when rendered via a display, can be colored based on their perceived class. In at least one example, the perception system 322 can perform operations described herein as being performed by the detectors 323, which can correspond to the detectors described above in FIGS. 1 and 8. In other examples, similar processes (detection, classification, segmentation, etc.) may be performed by the perception system 322 and/or by another system that provides input to the perception system 322. The perception system 322 can perform similar processes for one or more other modalities (e.g., light detection and ranging (LIDAR), radio detection and ranging (RADAR), Time of Flight (ToF) systems, etc.).

The prediction system 324, which can correspond to the prediction system 120 and 820, described above with reference to FIGS. 1 and 8, can access sensor data from the sensor system(s) 306, map data associated with a map (e.g., of the map(s) which can be in storage 330), and/or perception data output from the perception system 322 (e.g., processed sensor data), and can output predictions associated with one or more objects within the environment of the vehicle 302. In at least one example, the planning system 326, which can correspond to the planning system 122 and 822, described above with reference to FIGS. 1 and 8, can determine routes and/or trajectories to use to control the vehicle 302 based at least in part on sensor data received from the sensor system(s) 306 and/or any determinations made by the perception system 322 and/or prediction system 324. Additional details of localization systems, perception systems, prediction systems, and/or planning systems that are usable can be found in U.S. Pat. No. 9,612,123, issued on Apr. 4, 2017, and U.S. patent application Ser. No. 15/632,208, filed Jun. 23, 2017, now known as U.S. Pat. No. 10,353,390, issued on Jul. 16, 2019, the entire contents of both of which are incorporated by reference herein. In some examples (e.g., where the vehicle 302 is not an autonomous vehicle), one or more of the aforementioned systems can be omitted from the vehicle 302. While the systems described above are illustrated as "onboard" the vehicle 302, in other implementations, the systems can be remotely located and/or accessible to the vehicle 302. Furthermore, while the systems are described above as "systems," such systems can comprise one or more components for performing operations attributed to each of the systems.

In at least one example, the localization system 320, the perception system 322, the prediction system 324, and/or the planning system 326 can process sensor data, as described above, and can send their respective outputs over network(s) 332, to computing device(s) 334. In at least one example, the localization system 320, the perception system 322, the prediction system 324, and/or the planning system 326 can send their respective outputs to the computing device(s) 334 at a particular frequency, after a lapse of a predetermined period of time, in near real-time, etc.

In at least one example, the vehicle computing device(s) 304 can include one or more system controllers 328, which can be configured to control steering, propulsion, braking, safety, emitters, communication, and other systems of the vehicle 302. These system controller(s) 328 can communicate with and/or control corresponding systems of the drive system(s) 314 and/or other systems of the vehicle 302.

In at least one example, the sensor system(s) 306 can include LIDAR sensors, RADAR sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, R, intensity, depth, etc.), wheel encoders, microphones, environment sensors (e.g., temperature sensors, humidity sensors, light sensors, pressure sensors, etc.), ToF sensors, etc. The sensor system(s) 306 can include multiple instances of each of these or other types of sensors. For instance, the LIDAR sensors can include individual LIDAR sensors located at the corners, front, back, sides, and/or top of the vehicle 302. As another example, the camera sensors can include multiple cameras positioned at various locations about the exterior and/or interior of the vehicle 302. The sensor system(s) 306 can provide input to the vehicle computing device(s) 304. In some examples, the sensor system(s) 306 can preprocess at least some of the sensor data prior to sending the sensor data to the vehicle computing device(s) 304. In at least one example, the sensor system(s) 306 can send sensor data, via the network(s) 332, to the computing device(s) 334 at a particular frequency, after a lapse of a predetermined period of time, in near real-time, etc.

The vehicle 302 can also include one or more emitters 308 for emitting light and/or sound, as described above. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 308 can be positioned at various locations about the exterior and/or interior of the vehicle 302.

The vehicle 302 can also include communication connection(s) 310 that enable communication between the vehicle 302 and other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device(s) 304 to another computing device or a network, such as network(s) 332. For example, the communications connection(s) 310 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 312 can directly connect the drive system(s) 314 and other systems of the vehicle 302.

In at least one example, the vehicle 302 can include drive system(s) 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include sensor system(s) to detect conditions of the drive system(s) 314 and/or the surroundings of the vehicle 302. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s), can be unique to the drive system(s) 314. In some cases, the sensor system(s) on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 314. Furthermore, the drive system(s) 314 also include communication connection(s) that enable communication by the respective drive module with other local or remote computing device(s).

In FIG. 3, the vehicle computing device(s) 304, sensor system(s) 306, emitter(s) 308, and the communication connection(s) 310 are shown onboard the vehicle 302. However, in some examples, the vehicle computing device(s) 304, sensor system(s) 306, emitter(s) 308, and the communication connection(s) 310 can be implemented outside of an actual vehicle (i.e., not onboard the vehicle 302).

As described above, the vehicle 302 can send sensor data to the computing device(s) 334, via the network(s) 332. In some examples, the vehicle 302 can send raw sensor data to the computing device(s) 334. In other examples, the vehicle 302 can send processed sensor data and/or representations of sensor data to the computing device(s) 334 (e.g., data output from the localization system 320, the perception system 322, the prediction system 324, and/or the planning system 326). In some examples, the vehicle 302 can send sensor data to the computing device(s) 334 at a particular frequency, after a lapse of a predetermined period of time, in near real-time, etc.

The computing device(s) 334 can receive the sensor data (raw or processed) from the vehicle 302 and/or other data collection devices (which can include other vehicles like 302), as well as data from one or more third party sources and/or systems. In at least one example, the computing device(s) 334 can include processor(s) 336 and memory 338 communicatively coupled with the processor(s) 336. In the illustrated example, the memory 338 of the computing device(s) 334 stores a training system 340, a map(s) storage 342 (e.g., storing one or more maps), a training data storage 344 (e.g., storing training data accessible to the training system 340), and a model(s) storage 346 (e.g., models output by the training system 340). In some examples, one or more of the systems and/or storage repositories can be associated with the vehicle 302 instead of, or in addition to, being associated with the memory 338 of the computing device(s) 334.

In at least one example, the training system 340 can train data model(s), which can be used for determining the presence of objects, or portions thereof, in image data as described herein. In at least one example, the training system 340 can train data model(s) using machine learning techniques. For instance, in at least one example, a convolutional neural network (CNN) can be trained using training data, which can include image data. Such training data can include image data including objects, pedestrians, heads, and so on (e.g., all of which can be considered regions) and, in some examples, image data where objects, pedestrians, heads, and so on are not present. In some examples, the training data can be labeled. For instance, in some examples, low variance regions and high variance regions can be labeled, and correspondence between low variance regions and high variance regions indicated. In some examples, high variance regions can be labeled, but low variance regions may not be labeled. In some examples, low variance regions can be labeled, but high variance regions may not be labeled. In some examples, the training data may not be labeled.

In at least one example, the training system 340 can train, using machine learning, a model for detecting objects (e.g., pedestrians, cyclists, other vehicles, etc.) in image data (e.g., an object detector). In such an example, the training data can include images tagged, or otherwise annotated, to indicate where an object is located, with an indication of a classification of the object. The CNN can analyze the training data to learn what constitutes an object in image data and can use such knowledge to detect like-objects in other image data (e.g., newly received image data). That is, the CNN can be trained to detect objects in image data. In at least one example, such a machine learned model can be used by the perception system 322 to detect objects in image data. In some examples, the machine learned model can output an indication (e.g., a bounding box) associated with a region of interest corresponding to a detected object and/or information associated with the detected object, as described above.

Furthermore, in at least one example, the CNN can be trained to classify objects in image data. For example, the training system 340 can train, using machine learning, a model for classifying objects in image data. In such an example, the training data can include images tagged, or otherwise annotated, to indicate where an object is located, with an indication of a classification of the object. In at least one example, the machine learned model can be trained to output a plurality of classifications associated with a detected object. For example, the machine learned model can be a multi-class classifier that is trained to output a probability that an object is associated with individual classes of the multi-class classifier. In some examples, the classifications can be ranked from highest probability to lowest probability.

In at least one example, the training system 340 can train, using machine learning, a model for detecting high variance regions in image data (e.g., the second detector 812 described above with reference to FIG. 8). In some examples, the training data can include images tagged, or otherwise annotated, to indicate where a high variance region is located. In other examples, high variance regions may not be tagged or otherwise annotated. As described above, a high variance region is a region where multiple instances of the region (e.g., regions classified with a same bounding box) in input data (e.g., image data, a batch of image data, an input space) are compared, a variance metric associated with the multiple instances of the region can meet or exceed a threshold. Such a variance metric can represent information inside of a bounding box associated with a region. In some examples, the variance metric can be based on entropy, pixel intensity, aspect ratios between boxes, and the like. In some examples, the training data can be output from another machine learned model. In at least one example, the training data can be an intermediate output of features. The CNN can analyze the training data to learn what constitutes a high variance region in image data and can use such knowledge to detect high variance regions in other image data (e.g., newly received image data). That is, the CNN can be trained to detect high variance regions in image data. Additional details associated with training a machine learned model for detecting a high variance region are described below with reference to FIG. 13. In at least one example, such a machine learned model can be used by the perception system 322 and/or the second detector 812 to detect high variance regions in image data. In some examples, the machine learned model can output an indication (e.g., a bounding box) associated with a region of interest corresponding to a detected high variance region and/or information associated with the detected high variance region, as described above.

Further, the training system 340 can train, using machine learning, a model for detecting low variance regions in image data (e.g., the first detector 802 described above with reference to FIG. 8). In such an example, the training data can include images tagged, or otherwise annotated, to indicate where a low variance region is located. In some examples, a higher variance region or input data can be projected into a lower dimensional space, whereby the result can be a space having a lower variance. Such a result can be tagged as, or otherwise indicated to be, a low variance region. As described above, a low variance region is a region where multiple instances of the region (e.g., regions classified with a same bounding box) in input data (e.g., image data, a batch of image data, an input space) are compared, a variance metric associated with the multiple instances of the region is below a threshold. Such a variance metric can represent information inside of a bounding box associated with a region. In some examples, the variance metric can be based on entropy, pixel intensity, aspect ratios between boxes, and the like. The CNN can analyze the training data to learn what constitutes a low variance region in image data and can use such knowledge to detect low variance regions in other image data (e.g., newly received image data). That is, the CNN can be trained to detect low variance regions in image data. Additional details associated with training a machine learned model for detecting a low variance region are described below with reference to FIG. 13. In at least one example, such a machine learned model can be used by the perception system 322 and/or the first detector 802 to detect low variance regions in image data. In some examples, the machine learned model can output an indication (e.g., a bounding box) associated with a region of interest corresponding to a detected low variance region and/or information associated with the detected high variance region, as described above.

In another example, the training system 340 can train, using machine learning, a model for detecting low variance regions in image data (e.g., the first detector 802 described above with reference to FIG. 8) using images tagged, or otherwise annotated, to indicate where a high variance region is located (but not a low variance region). The CNN can analyze the training data to learn what constitutes a low variance region in association with tagged high variance regions in image data and can use such knowledge to detect low variance regions in other image data (e.g., newly received image data). That is, the CNN can be trained to detect low variance regions in image data. Additional details associated with training a machine learned model for detecting a high variance region are described below with reference to FIG. 13. In at least one example, such a machine learned model can be used by the perception system 322 and/or the first detector 802 to detect low variance regions in image data. In some examples, the machine learned model can output an indication (e.g., a bounding box) associated with a region of interest corresponding to a detected low variance region and/or information associated with the detected high variance region, as described above.

In some examples, the training system 340 can train, using machine learning, a model for detecting high variance regions, based on low variance features, by modelling an end-to-end optimization problem. In such examples, the low variance outputs may not be explicitly modeled, but instead, a model can be trained to detect high variance regions based at least in part on implicit low variance regions. In an example, input data (e.g., image data) can be projected (e.g., via a neural network) into a feature space that represents the input data. Such feature space includes high-level information for object detection. In an example, another neural network can be used to reconstruct the input data (e.g., image data) based on features in the feature space. That is, the features can be projected into an image space (e.g., using a neural network). In at least one example, a loss function can be employed to enforce consistency between the input data and the reconstructed input data. That is, a loss function can be employed by the training system 340 to train a model to focus on low variance features for detecting high variance regions (e.g., explicitly modelling high variance regions). Additional details associated with training a machine learned model for detecting a high variance region are described below with reference to FIG. 13.

In any such examples, the machine learned model(s) (which can be associated with the detector(s) described above with reference to FIGS. 1 and 8) may be trained independently and, in some examples, pre-informed of relationships between low variance regions and high variance regions. In some examples, the machine learned model(s) can be trained end-to-end. When trained end-to-end, such training may enforce the coupling between low variance regions which inform the ultimate output. In some examples, training such a machine learned model to detect a low variance region may comprise evaluating and back-propagating based at least in part on a loss function which determines a measure of the variance of an associated region in the input space. Additional details associated with training a machine learned model for detecting a high variance region are described below with reference to FIG. 13.

In at least those examples in which both the first detector 802 and the second detector 812 both comprise machine learned models, each may comprise a separate network, may comprise different aspects of a common network, or may otherwise comprise a combination of multiple networks. In any of the examples provided herein, any of the machine learned models may be trained end-to-end, jointly, disjointly, or the like. In such examples where the models are trained end-to-end or jointly, common features may be leveraged by one network to improve outputs of the other (e.g., where features learned by the first detector 802 to detect low variance regions are used to predict high variance regions in the second detector 812).

In another example, the training system 340 can train, using machine learning, a model for detecting pedestrians in image data (e.g., a pedestrian detector). In some examples, the training data can include images tagged, or otherwise annotated, to indicate where a pedestrian is located. In additional or alternative examples, the training data can be output from another machine learned model. In at least one example, the training data can be an intermediate output of features. The CNN can analyze the training data to learn what constitutes a pedestrian in image data and can use such knowledge to detect pedestrians in other image data (e.g., newly received image data). That is, the CNN can be trained to detect pedestrians in image data. In at least one example, such a machine learned model can be used by the perception system 322 and/or the pedestrian detector 112 to detect pedestrians in image data. In some examples, the machine learned model can output an indication (e.g., a bounding box) associated with a region of interest corresponding to a detected pedestrian and/or information associated with the detected pedestrian, as described above.

Further, the training system 340 can train, using machine learning, a model for detecting heads in image data (e.g., a head detector). In such an example, the training data can include images tagged, or otherwise annotated, to indicate where a head is located. The CNN can analyze the training data to learn what constitutes a head in image data and can use such knowledge to detect heads in other image data (e.g., newly received image data). That is, the CNN can be trained to detect heads in image data. In at least one example, such a machine learned model can be used by the perception system 322 and/or the head detector 102 to detect heads in image data. In some examples, the machine learned model can output an indication (e.g., a bounding box) associated with a region of interest corresponding to a detected head and/or information associated with the detected pedestrian, as described above.

In at least those examples in which both the head detector 102 and the pedestrian detector 112 both comprise machine learned models, each may comprise a separate network, may comprise different aspects of a common network, or may otherwise comprise a combination of multiple networks. In any of the examples provided herein, any of the machine learned models may be trained end-to-end, jointly, disjointly, or the like. In such examples where the models are trained end-to-end or jointly, common features may be leveraged by one network to improve outputs of the other (e.g., where features learned by the head detector 102 to detect heads are used to predict pedestrians in pedestrian detector 112).

In some examples, outputs from other machine learned models can be used as part of the training data for training and/or updating the data model(s) described herein. For example, outputs of the head detector 102 and/or an object detector can be used to train the machine learned model to identify pedestrians (e.g., the pedestrian detector). In an additional or alternative example, outputs of the head detector 102 can be used to train the machine learned model to identify objects (e.g., the object detector), so that the object detector includes the classification of "head" in the plurality of classifications output in association with a detected object.

Although discussed in the context of CNNs above, any type of machine learning can be used consistent with this disclosure. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc.

The resulting data model(s) can be stored in the model(s) storage 346 and/or the storage 330 on the vehicle 302 and can be accessed by the perception system 322 for detecting and/or classifying objects.

The processor(s) 316 of the vehicle 302 and the processor(s) 336 of the computing device(s) 334 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 338 are examples of non-transitory computer-readable media. Memory 318 and 338 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, systems of the vehicle 302 can be associated with the computing device(s) 334 and/or systems of the computing device(s) 334 can be associated with the vehicle 302. That is, the vehicle 302 can perform one or more of the functions associated with the computing device(s) 334, and vice versa.

FIGS. 4-7 and 9-12 are flowcharts showing example methods involving techniques as described herein. The processes illustrated in FIGS. 4-7 and 9-12 are described with reference to the system 300 shown in FIG. 3 for convenience and ease of understanding. However, the processes illustrated in FIGS. 4-7 and 9-12 are not limited to being performed using the system 300. Moreover, the system 300 described herein is not limited to performing the processes illustrated in FIGS. 4-7 and 9-12.

The processes 400-700 and 900-1200 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 400-700 and 900-1200 can be combined in whole or in part with each other or with other methods.

Figure 9:
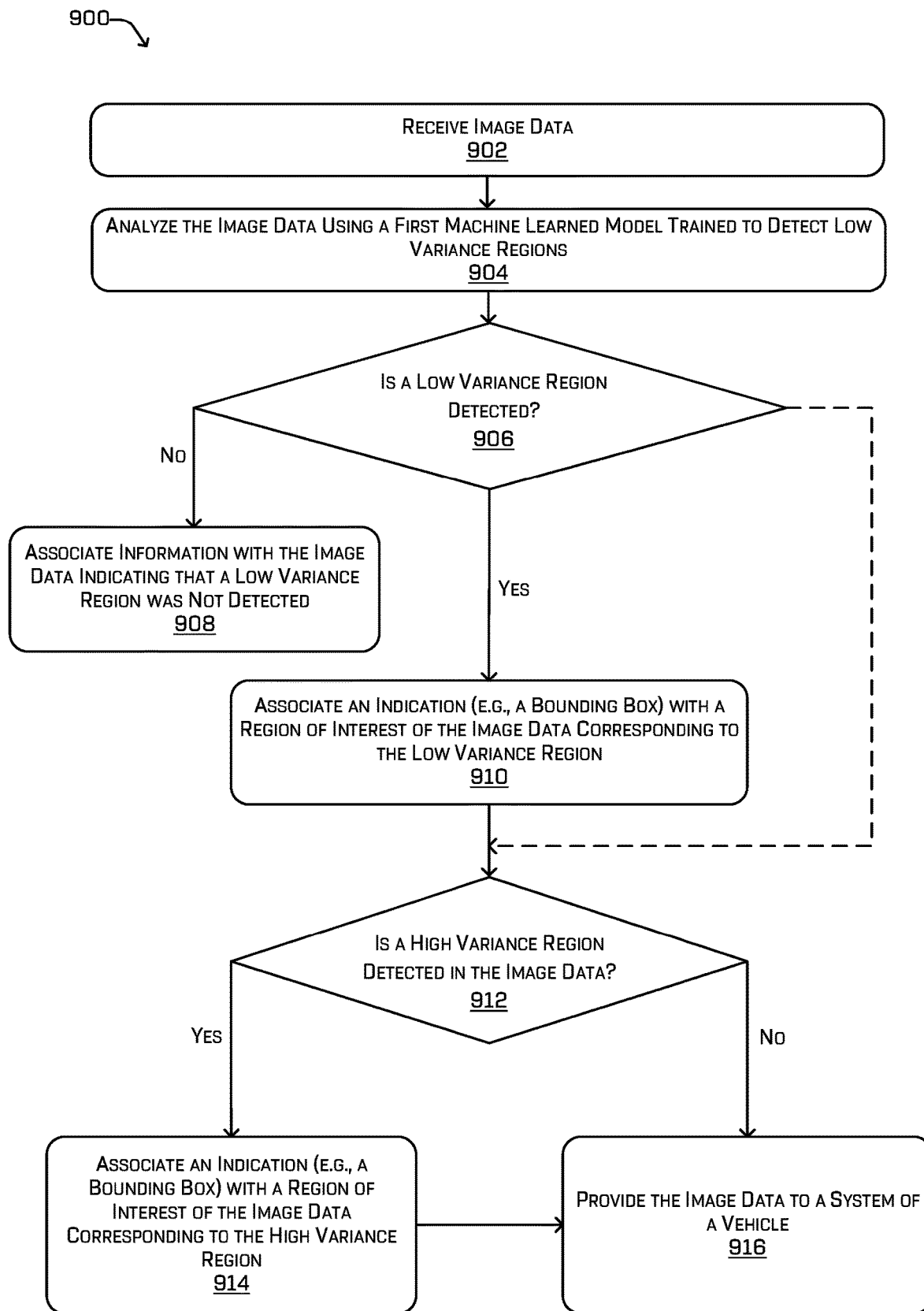
FIG. 9 illustrates an example process for using sub-region techniques for improving detection, as described herein.

FIG. 9 illustrates an example process 900 for using sub-region detection techniques for improving detections (including detections associated with high variance input data), as described herein.

At operation 902, the perception system 322 receives image data. As described above, a vehicle 302 can include one or more sensor systems 306. The sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), ToF sensors, etc. The sensor system(s) 306 can provide input to the vehicle computing device(s) 304. In at least one example, the sensor system(s) 306 can provide image data to the perception system 322.

At operation 904, the perception system 322 analyzes the image data using a first machine learned model trained to detect low variance regions. As described above with reference to FIG. 3, the perception system 322 can perform object detection, segmentation, and/or classification based at least in part on sensor data received from the sensor system(s) 306. In at least one example, the perception system 322 can receive the image data and can utilize one or more image processing algorithms to perform object detection, segmentation, and/or classification with respect to object(s) identified in the image data. In at least one example, the perception system 322 can perform low variance region detection using a first detector 802. As described above, in at least one example, the first detector 802 can utilize a neural network for detecting low variance region(s) associated with the image data. However, in additional or alternative examples, the first detector 802 can use any other type of machine learned model for detecting low variance region(s) associated with the image data. Any of the aforementioned machine learned models can be used by the first detector 802 for low variance region detection. The first detector 802 can generate an output based at least in part on analyzing the image data with the machine learned model.

For the purpose of this discussion, the use of the term "output" can refer to information generated by analyzing the image data using the first machine learned model. In some examples, the term "output" can refer to information that is explicitly modeled. However, in other examples, the term "output" can refer to any indication and/or information generated by analyzing the image data, including but not limited to an intermediary output associated with individual layers of the first machine learned model. In some examples, an "output" can be associated with an indication of a low variance region, which can be in the image data or associated with the image data. In examples where the indication of the low variance region is associated with the image data, such an indication can be derived from the image data and/or can be output via some portion of the first machine learned model.

At operation 906, the perception system 322 determines whether a low variance region is detected in association with the image data. In at least one example, the perception system 322 can analyze the output of the first detector 802 to determine whether a low variance region is detected in association with the image data. If a low variance region is not detected, the first detector 802 can associate information with the image data indicating that a low variance region was not detected, as illustrated at operation 908. However, if a low variance region is detected, the first detector 802 can associate an indication with a region of interest of the image data corresponding to the low variance region, as illustrated at operation 910.

As described above, in at least one example, the first detector 802 can generate an output, which can include the image data associated with an indication of whether a low variance region was detected by the first detector 802. In some examples, the indication can be a bounding box that surrounds a region of interest corresponding to low variance region in the image data. In other examples, any other type of indication can be used to indicate whether a low variance region was detected by the first detector 802. In at least one example, the indication(s) can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a low variance region was detected (e.g., a binary indication (i.e., low variance region detected (H) or not (N)), a probability, etc.), etc., as well as any uncertainties associated therewith. In at least one example, the perception system 322 can analyze the output to determine whether the image data is associated with indication(s) and/or information indicative that a low variance region was detected.

In some examples, the first detector 802 may not associate an indication such as a bounding box with a region of interest and instead, may provide an indication of the low variance region (e.g., features, information associated therewith) to a second detector 812, which is shown by the dashed line between operation 906 and 912.

At operation 912, the perception system 322 determines whether a high variance region is detected in the image data. In at least one example, the second detector 812 can determine whether a high variance region is present in the image data. That is, the second detector 812 can analyze the image data to determine whether a high variance region is present in the image data. In some examples, the second detector 812 can use one or more statistical models to determine whether a high variance region is present in an environment. For example, statistical priors, derived from training image data, can be used to infer that a high variance region is present in image data based on the detection of the low variance region. In some examples, the high variance region can have been previously coupled with the low variance region.

As a non-limiting example, if statistical priors indicate that a pair of headlights are ⅓ the height of a vehicle and positioned 48 inches apart, a high variance region (e.g., a vehicle) can be inferred to be present in the image data and an indication can be associated therewith, as described below. In at least some examples, such statistical analysis may be performed based on, for example, binning sizes and/or proportions of detected low variance regions (e.g., a first bin from 0 to 1, a second bin from 1 to 1.5, etc. with respect to a height to width ratio of the detected face) and associating a bounding box size and/or relative position which each bin for the corresponding ratio based on averages of detections associated therewith. In other examples, various other statistical analyses may be performed on the data to associate a bounding box size and/or position based on the low variance region detection. As such, the second detector 812 can detect a high variance region. In an additional or alternative example, the second detector 812 can use one or more machine learned models to determine whether a high variance region is present in an environment. Additional details are described below with reference to FIGS. 10-12.

Based at least in part on determining that a high variance region is present in the image data, the second detector 812 can associate an indication (e.g., a bounding box) with a region of interest of the image data corresponding to a high variance region, as illustrated at operation 914. As described above, in at least one example, the output of the second detector 812 can include one or more indications that are associated with regions of interest corresponding to an identified high variance region in the environment within which the vehicle 302 is positioned. In some examples, the indication can be a bounding box that surrounds a region of interest corresponding to high variance region in the image data. In other examples, any other type of indication can be used to indicate that a high variance region was detected in the environment by the second detector 812. In at least one example, the indication can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc., as well as any uncertainties associated therewith.

At operation 916, the perception system 322 can provide the image data to another system of the vehicle 302. In at least one example, the output of the perception system 322 can be provided to other vehicle system(s) of the vehicle 302. Such system(s) can include a prediction system 324, a planning system 326, and so on. In at least one example, the output can be provided to the other vehicle system(s) for making determinations with respect to controlling the vehicle 302, for instance, for determining a trajectory along which the vehicle 302 is to drive and causing the vehicle 302 to drive along the trajectory.

The output of the perception system 322 can be provided to other vehicle system(s) of the vehicle 302 regardless of whether a high variance region is detected in the image data. However, if a high variance region is detected, the output can include image data associated with indication(s) and/or information associated with the detected high variance region. The other system(s) of the vehicle 302 can use the input to perform operations as described above with reference to FIG. 3.

Figure 4:
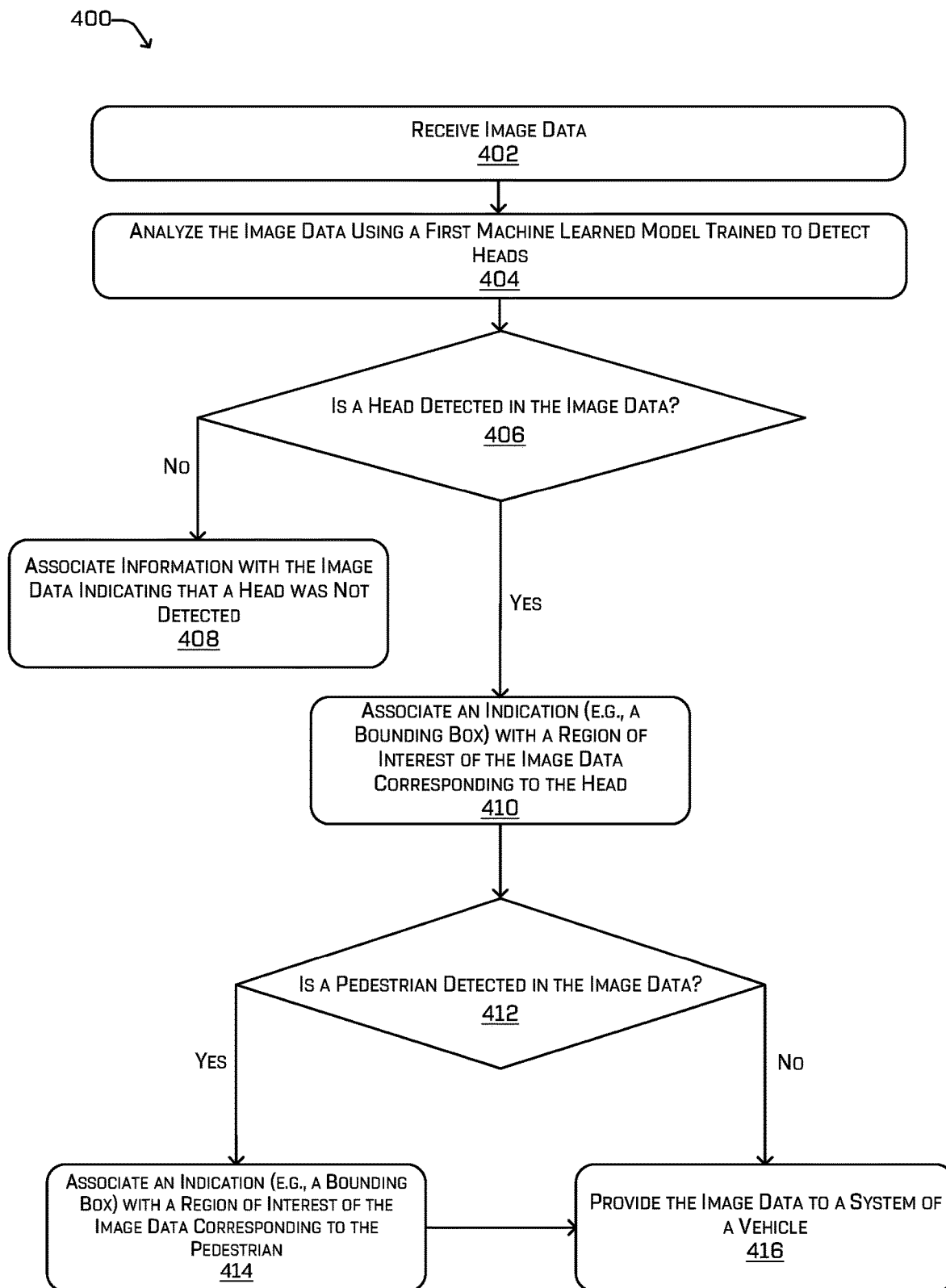
FIG. 4 illustrates an example process for using head detection techniques for improving pedestrian detection, as described herein.

FIG. 4 illustrates an example process 400 for using head detection techniques for improving pedestrian detection, as described herein.

At operation 402, the perception system 322 receives image data. As described above, a vehicle 302 can include one or more sensor systems 306. The sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), ToF sensors, etc. The sensor system(s) 306 can provide input to the vehicle computing device(s) 304. In at least one example, the sensor system(s) 306 can provide image data to the perception system 322.

At operation 404, the perception system 322 analyzes the image data using a first machine learned model trained to detect heads. As described above with reference to FIG. 3, the perception system 322 can perform object detection, segmentation, and/or classification based at least in part on sensor data received from the sensor system(s) 306. In at least one example, the perception system 322 can receive the image data and can utilize one or more image processing algorithms to perform object detection, segmentation, and/or classification with respect to object(s) identified in the image data. In at least one example, the perception system 322 can perform head detection using a head detector 102. As described above, in at least one example, the head detector 102 can utilize a neural network for detecting head(s) in the image data and/or otherwise associated therewith. However, in additional or alternative examples, the head detector 102 can use any other type of machine learned model for detecting head(s) in the image data and/or otherwise associated therewith. Examples of machine learned models that can be used by the head detector 102 include, but are not limited to, FaceMatch, Face Everything, Fisherfaces, DeepID Test, Tensorflow, OpenFace, TinyFaces, etc. Any of the aforementioned machine learned models can be used by the head detector 102 for head detection, or a machine learned model trained by the training system 340 can be used by the head detector 102 for head detection. The head detector 102 can generate an output based at least in part on analyzing the image data with the machine learned model.

At operation 406, the perception system 322 determines whether a head is detected in the image data. In at least one example, the perception system 322 can analyze the output of the head detector 102 to determine whether a head is detected in the image data. If a head is not detected in the image data, the head detector 102 can associate information with the image data indicating that a head was not detected, as illustrated at operation 408. However, if a head is detected, the head detector 102 can associate an indication (e.g., a bounding box) with a region of interest of the image data corresponding to the head, as illustrated at operation 410.

As described above, in at least one example, the head detector 102 can generate an output, which can include the image data associated with an indication of whether a head was detected by the head detector 102. In some examples, the indication can be a bounding box that surrounds a region of interest corresponding to a head in the image data. In other examples, any other type of indication can be used to indicate whether a head was detected by the head detector 102. In at least one example, the indication(s) can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a head was detected (e.g., a binary indication (i.e., head detected (H) or not (N)), a probability, etc.), etc., as well as any uncertainties associated therewith. In at least one example, the perception system 322 can analyze the output to determine whether the image data is associated with indication(s) and/or information indicative that a head was detected.

At operation 412, the perception system 322 determines whether a pedestrian is detected in the image data. In at least one example, the pedestrian detector 112 can determine whether a pedestrian is present in the image data. That is, the pedestrian detector 112 can analyze the image data to determine whether a pedestrian is present in the image data. In some examples, the pedestrian detector 112 can use one or more statistical models to determine whether a pedestrian is present in an environment. For example, statistical priors, derived from training image data, can be used to infer that a pedestrian is present in image data based on the detection of the head. As a non-limiting example, if statistical priors indicate that a head is ⅛ the size of a body and the head is looking in a particular direction, a pedestrian can be inferred to be present in the image data and an indication can be associated therewith, as described below. In at least some examples, such statistical analysis may be performed based on, for example, binning sizes and/or proportions of detected heads/faces (e.g., a first bin from 0 to 1, a second bin from 1 to 1.5, etc. with respect to a height to width ratio of the detected face) and associating a bounding box size and/or relative position which each bin for the corresponding ratio based on averages of detections associated therewith. In other examples, various other statistical analyses may be performed on the data to associate a bounding box size and/or position based on the head/face detection. As such, the pedestrian detector 112 can detect a pedestrian. In an additional or alternative example, the pedestrian detector 112 can use one or more machine learned models to determine whether a pedestrian is present in an environment. Additional details are described below with reference to FIGS. 5-7.

Based at least in part on determining that a pedestrian is present in the image data, the pedestrian detector 112 can associate an indication (e.g., a bounding box) with a region of interest of the image data corresponding to a pedestrian, as illustrated at operation 414. As described above, in at least one example, the output of the pedestrian detector 112 can include one or more indications that are associated with regions of interest corresponding to an identified pedestrian in the environment within which the vehicle 302 is positioned. In some examples, the indication can be a bounding box that surrounds a region of interest corresponding to a pedestrian in the image data. In other examples, any other type of indication can be used to indicate that a pedestrian was detected in the environment by the pedestrian detector 112. In at least one example, the indication can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc., as well as any uncertainties associated therewith.

At operation 416, the perception system 322 can provide the image data to another system of the vehicle 302. In at least one example, the output of the perception system 322 can be provided to other vehicle system(s) of the vehicle 302. Such system(s) can include a prediction system 324, a planning system 326, and so on. In at least one example, the output can be provided to the other vehicle system(s) for making determinations with respect to controlling the vehicle 302, for instance, for determining a trajectory along which the vehicle 302 is to drive and causing the vehicle 302 to drive along the trajectory.

The output of the perception system 322 can be provided to other vehicle system(s) of the vehicle 302 regardless of whether a pedestrian is detected in the image data. However, if a pedestrian is detected, the output can include image data associated with indication(s) and/or information associated with the detected pedestrian. The other system(s) of the vehicle 302 can use the input to perform operations as described above with reference to FIG. 3.

Figure 10:
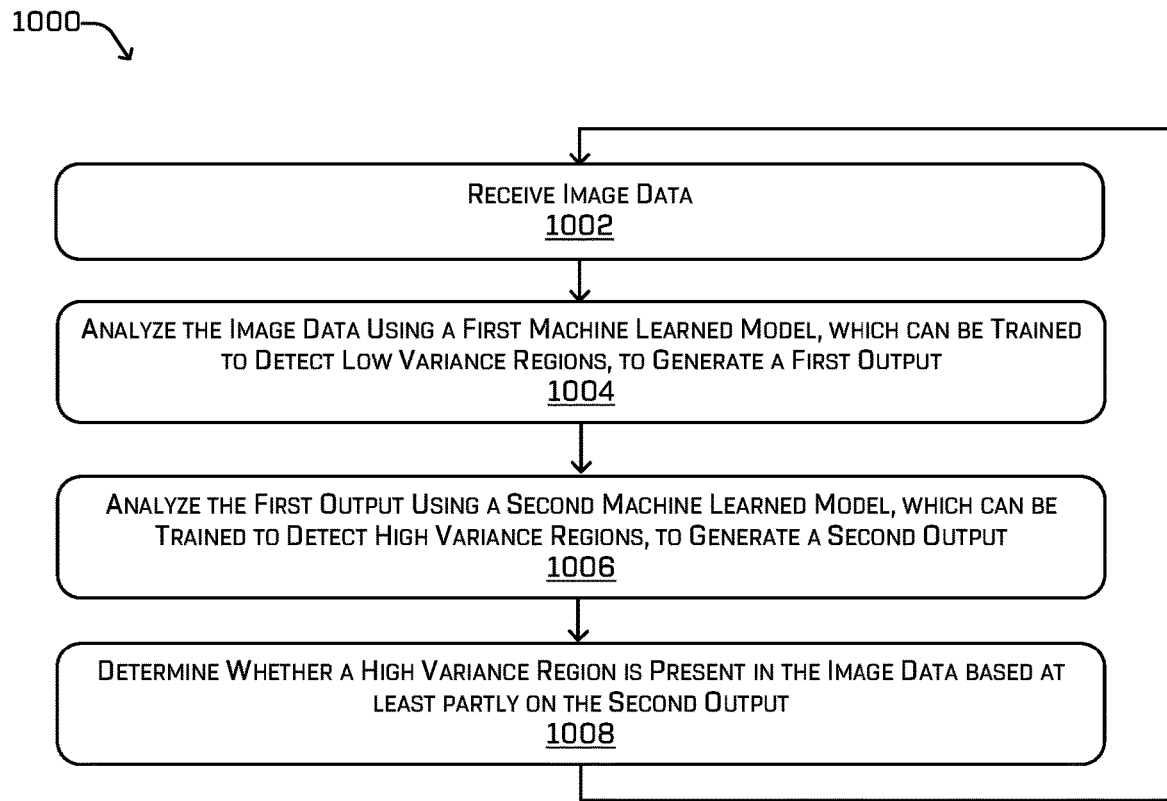
FIG. 10 illustrates an example process for determining whether a high variance region is present in image data associated with an environment using machine learned models, as described herein.

FIG. 10 illustrates an example process 1000 for determining whether a high variance region is present in image data associated with an environment using machine learned models, as described herein.

At operation 1002, the perception system 322 receives image data, as described above at operation 902.

At operation 1004, the perception system 322 analyzes the image data using a first machine learned model, which can be trained to detect low variance regions, to generate a first output. As described above with reference to FIG. 3 and also at operation 904 of FIG. 9, the perception system 322 can perform object detection, segmentation, and/or classification based at least in part on sensor data received from the sensor system(s) 306. In at least one example, the perception system 322 can receive the image data and can utilize one or more image processing algorithms to perform object detection, segmentation, and/or classification with respect to object(s) identified in the image data. In at least one example, the perception system 322 can perform low variance region detection using a first detector 802, as described above with reference to FIG. 8. As described above, in at least one example, the first detector 802 can utilize a neural network for detecting low variance region(s) associated with the image data.

In at least one example, the first detector 802 can generate an output (e.g., a "first output" as used herein FIG. 10), which can include the image data associated with an indication of whether a low variance region was detected by the first detector 802. In some examples, the indication can be a bounding box that surrounds a region of interest corresponding to a low variance region associated with the image data. In other examples, any other type of indication can be used to indicate whether a low variance region was detected by the first detector 802. In at least one example, the indication(s) can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a low variance region was detected (e.g., a binary indication (i.e., low variance region detected (H) or not (N)), a probability, etc.), etc. In at least one example, the perception system 322 can analyze the output to determine whether the image data is associated with indication(s) and/or information indicative that a low variance region was detected.

As described above, for the purpose of this discussion, the use of the term "first output" can refer to information generated by analyzing the image data using the first machine learned model. In some examples, the term "first output" can refer to information that is explicitly modeled. However, in other examples, the term "first output" can refer to any indication and/or information generated by analyzing the image data, including but not limited to an intermediary output associated with individual layers of the first machine learned model. In some examples, a "first output" can be associated with an indication of a low variance region, which can be in the image data or associated with the image data. In examples where the indication of the low variance region is associated with the image data, such an indication can be derived from the image data and/or can be output via some portion of the first machine learned model.

At operation 1006, the perception system 322 can analyze the first output using a second machine learned model, which can be trained to detect high variance regions, to generate a second output. In at least one example, the first output can be input into a second machine learned model for detecting high variance regions. The second machine learned model can be trained by the training system 340 as described above with reference to FIG. 3. As described above, in some examples, low variance and high variance correspondence can be explicit (e.g., by pre-informing machine learned model(s) of such correspondence). In some examples, machine learned model(s) can be trained to detect low variance features, which can serve as proxies for high variance regions, without explicitly modelling low variance outputs. Where described in some examples herein as a low variance detection (or region) informing a high variance detection, such examples are meant to be inclusive of multiple networks (e.g., in which a low variance network output is used to provide additional context to a high variance detector network), single networks trained to determine regions of low variance (e.g., having losses associated therewith which are based at least in part on variance in the input region) and couple to regions of general detections (e.g., by coupling detection losses with variance-based losses), and/or any combination thereof, etc.

In such an example, the second detector 812 can analyze the first output to generate a second output. The second output can include one or more indications that are associated with a region of interest corresponding to an identified high variance region in the environment within which the vehicle 302 is positioned. In some examples, the indication can be a bounding box that surrounds a region of interest corresponding to high variance region in the image data. In other examples, any other type of indication can be used to indicate that a high variance region was detected in the environment by the second detector 812. In at least one example, the indication can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc.

At operation 1008, the perception system 322 can analyze the second output to determine whether a high variance region is present in the image data. That is, in at least one example, the perception system 322 can analyze the second output to determine whether the image data is associated with indication(s) and/or information indicative that a high variance region was detected. The perception system 322 can provide the image data to other system(s) of the vehicle 302 for controlling operation of the vehicle 302, as described above with reference to FIGS. 3 and 9.

Of course, though depicted in FIG. 10 as distinct operations, operations 1004, 1006, and/or 1008 may be combined into a single machine learned model (or network) whereby features are shared between the subnetworks, wherein an output of one is input into another, whereby the outputs comprise separate low variance regions of a network, or the like.

Figure 5:
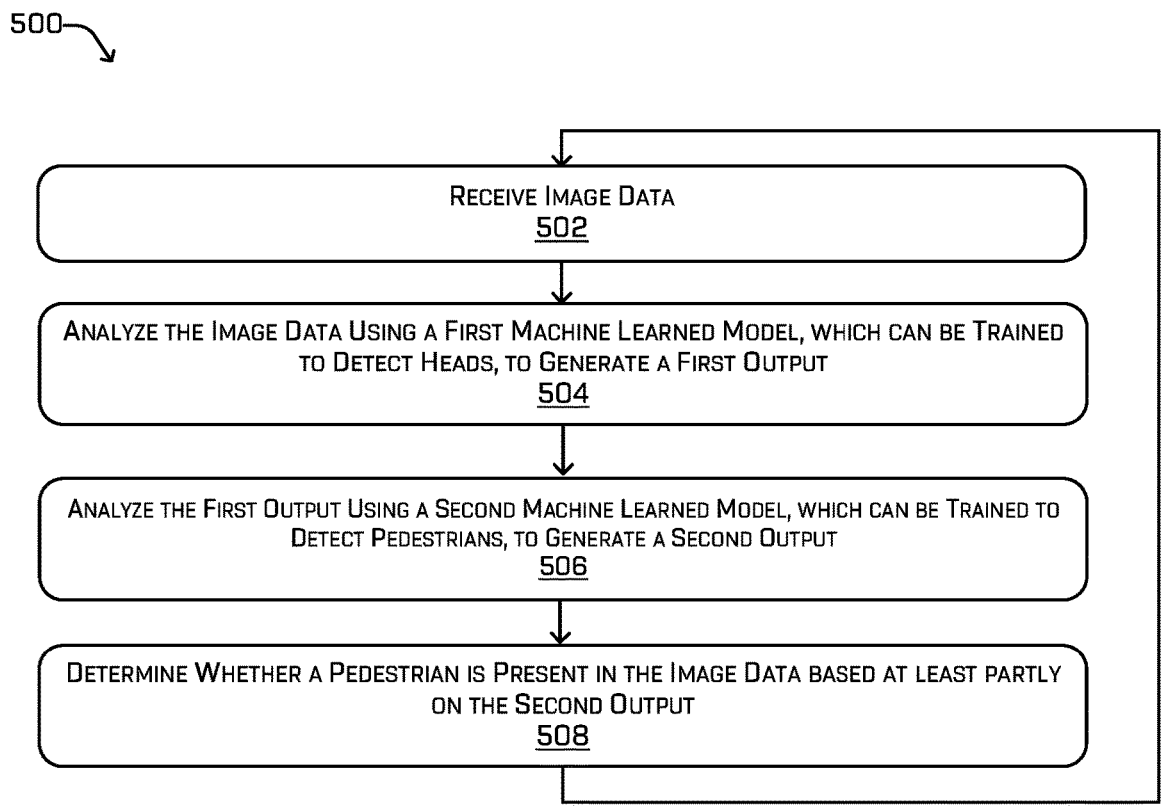
FIG. 5 illustrates an example process for determining whether a pedestrian is present in image data associated with an environment using machine learned models, as described herein.

FIG. 5 illustrates an example process 500 for determining whether a pedestrian is present in image data associated with an environment using machine learned models, as described herein.

At operation 502, the perception system 322 receives image data, as described above at operation 402.

At operation 504, the perception system 322 analyzes the image data using a first machine learned model, which can be trained to detect heads, to generate a first output. As described above with reference to FIG. 3 and also at operation 404 of FIG. 4, the perception system 322 can perform object detection, segmentation, and/or classification based at least in part on sensor data received from the sensor system(s) 306. In at least one example, the perception system 322 can receive the image data and can utilize one or more image processing algorithms to perform object detection, segmentation, and/or classification with respect to object(s) identified in the image data. In at least one example, the perception system 322 can perform head detection using a head detector 102. As described above, in at least one example, the head detector 102 can utilize a neural network for detecting head(s) in the image data.

In at least one example, the head detector 102 can generate an output (e.g., a "first output" as used herein FIG. 5), which can include the image data associated with an indication of whether a head was detected by the head detector 102. In some examples, the indication can be a bounding box that surrounds a region of interest corresponding to a head in the image data. In other examples, any other type of indication can be used to indicate whether a head was detected by the head detector 102. In at least one example, the indication(s) can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a head was detected (e.g., a binary indication (i.e., head detected (H) or not (N)), a probability, etc.), etc. In at least one example, the perception system 322 can analyze the output to determine whether the image data is associated with indication(s) and/or information indicative that a head was detected.

At operation 506, the perception system 322 can analyze the first output using a second machine learned model, which can be trained to detect pedestrians, to generate a second output. In at least one example, the first output can be input into a machine learned model for detecting pedestrians. The machine learned model can be trained by the training system 340 as described above with reference to FIG. 3. In such an example, the pedestrian detector 112 can analyze the first output to generate a second output. The second output can include one or more indications that are associated with regions of interest corresponding to an identified pedestrian in the environment within which the vehicle 302 is positioned. In some examples, the indication can be a bounding box that surrounds a region of interest corresponding to pedestrian in the image data. In other examples, any other type of indication can be used to indicate that a pedestrian was detected in the environment by the pedestrian detector 112. In at least one example, the indication can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc.

At operation 508, the perception system 322 can analyze the second output to determine whether a pedestrian is present in the image data. That is, in at least one example, the perception system 322 can analyze the second output to determine whether the image data is associated with indication(s) and/or information indicative that a pedestrian was detected. The perception system 322 can provide the image data to other system(s) of the vehicle 302 for controlling operation of the vehicle 302, as described above with reference to FIGS. 3 and 4.

Of course, though depicted in FIG. 5 as distinct operations, operations 504, 506, and/or 508 may be combined into a single machine learned model (or network) whereby features are shared between the subnetworks, wherein an output of one is input into another, whereby the outputs comprise separate heads of a network, or the like.

Figure 11:
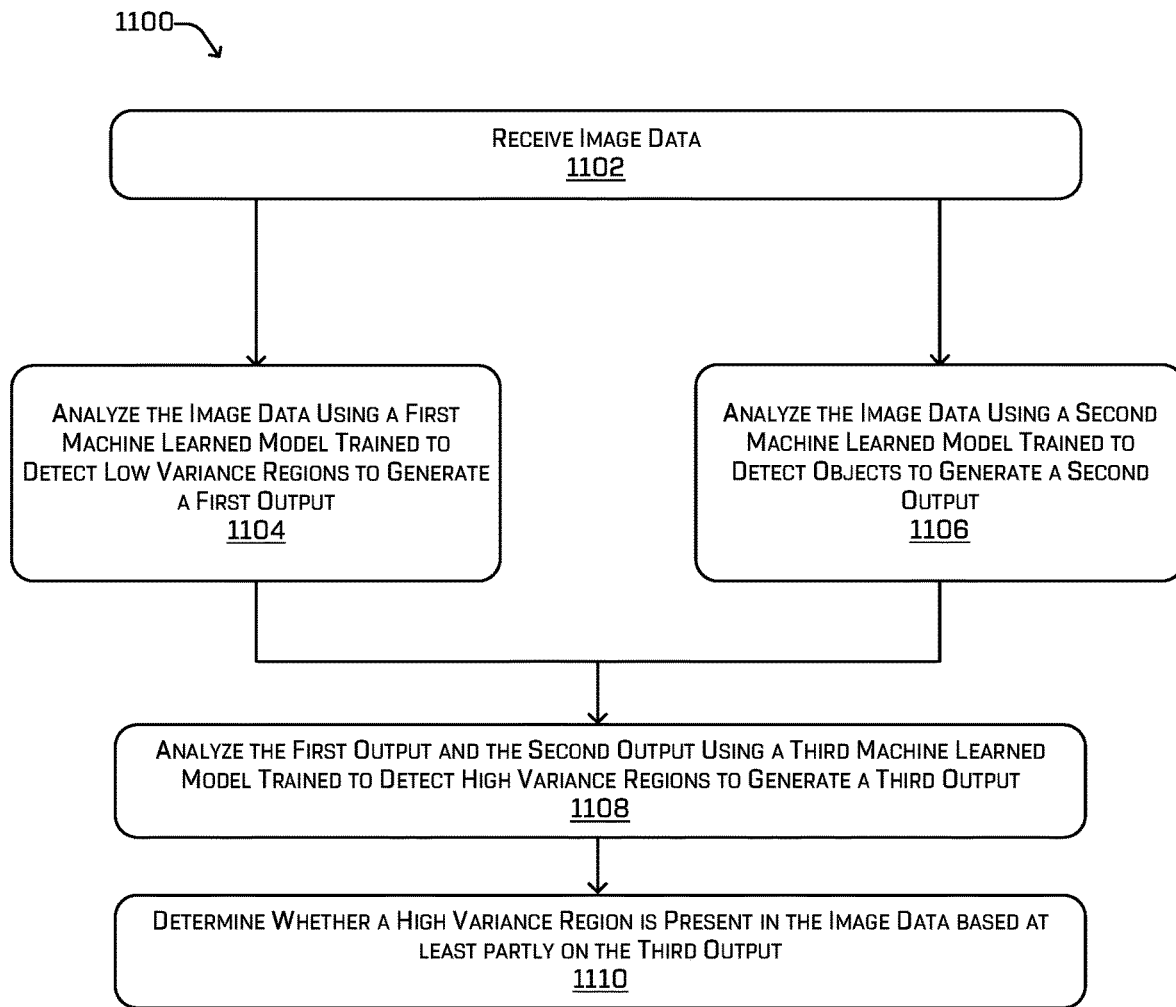
FIG. 11 illustrates another example process for determining whether a high variance region is present in image data associated with an environment using machine learned models, as described herein.

FIG. 11 illustrates another example process 1100 for determining whether a high variance region is present in image data associated with an environment using machine learned models, as described herein.

At operation 1102, the perception system 322 receives image data, as described above at operation 902.

At operation 1104, the perception system 322 analyzes the image data using a first machine learned model trained to detect low variance regions to generate a first output. As described above with reference to FIG. 3 and also above at operation 904 of FIG. 9, the perception system 322 can perform object detection, segmentation, and/or classification based at least in part on sensor data received from the sensor system(s) 306. In at least one example, the perception system 322 can receive the image data and can utilize one or more image processing algorithms to perform object detection, segmentation, and/or classification with respect to object(s) identified in the image data. In at least one example, the perception system 322 can perform low variance region detection using a first detector 802, as described above with reference to FIG. 8. As described above, in at least one example, the first detector 802 can utilize a neural network for detecting low variance region(s) associated with the image data.

As described above, in at least one example, the first detector 802 can generate an output (e.g., a "first output" as used here, in FIG. 11), which can include the image data associated with an indication of whether a low variance region was detected by the first detector 802. In some examples, the indication can be a bounding box that surrounds a region of interest corresponding to a low variance region in the image data. In other examples, any other type of indication can be used to indicate whether a low variance region was detected by the first detector 802. In at least one example, the indication(s) can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a low variance region was detected (e.g., a binary indication (i.e., low variance region detected (H) or not (N)), a probability, etc.), etc. In at least one example, the perception system 322 can analyze the output to determine whether the image data is associated with indication(s) and/or information indicative that a low variance region was detected.

As described above, for the purpose of this discussion, the use of the term "first output" can refer to information generated by analyzing the image data using the first machine learned model. In some examples, the term "first output" can refer to information that is explicitly modeled. However, in other examples, the term "first output" can refer to any indication and/or information generated by analyzing the image data, including but not limited to an intermediary output associated with individual layers of the first machine learned model. In some examples, a "first output" can be associated with an indication of a low variance region, which can be in the image data or associated with the image data. In examples where the indication of the low variance region is associated with the image data, such an indication can be derived from the image data and/or can be output via some portion of the first machine learned model.

At operation 1106, the perception system 322 analyzes the image data using a second machine learned model trained to detect objects to generate a second output. As described above, the perception system 322 can perform object detection, segmentation, and/or classification based at least in part on sensor data received from the sensor system(s) 306 of the vehicle 302. In at least one example, the perception system 322 can utilize a machine learned model trained to detect and/or classify objects in the image data (e.g., an object detector). Such a machine learned model can be trained by the training system 340 described above with reference to FIG. 3. In at least one example, the perception system 322 can output an intermediate output of features detected by the second machine learned model that are used to detect and/or classify objects in image data. For the purpose of the discussion of process 1100, the intermediate output of features can be referred to as the "second output." In at least one example, the first output and the second output can be output at or near the same time. That is, in such an example, the first machine learned model and the second machine learned model can analyze the image data at the same time and/or in parallel.

Similar to what is described above, for the purpose of this discussion, the use of the term "second output" can refer to information generated by analyzing the image data using the second machine learned model. In some examples, the term "second output" can refer to information that is explicitly modeled. However, in other examples, the term "second output" can refer to any indication and/or information generated by analyzing the image data, including but not limited to an intermediary output associated with individual layers of the second machine learned model. In some examples, a "second output" can be associated with an indication of an object (which, in some examples, can be associated with a high variance region), which can be in the image data or associated with the image data. In examples where the indication of the object is associated with the image data, such an indication can be derived from the image data and/or can be output via some portion of the second machine learned model.

At operation 1108, the perception system 322 can analyze the first output and the second output using a third machine learned model trained to detect high variance regions to generate a third output. In at least one example, the first output and the second output can be input into a machine learned model for detecting high variance regions, which can be utilized by the second detector 812. In such an example, the second detector 812 can analyze the first output and the second output to generate a third output. The third output can include one or more indications that are associated with region(s) of interest corresponding to identified high variance region(s) in the environment within which the vehicle 302 is positioned. In some examples, an indication can be a bounding box that surrounds a region of interest corresponding to a high variance region in the image data. In other examples, any other type of indication can be used to indicate that a high variance region was detected in the environment by the second detector 812. In at least one example, the indication can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc.

As described above, in some examples, low variance and high variance correspondence can be explicit (e.g., by pre-informing machine learned model(s) of such correspondence). In some examples, machine learned model(s) can be trained to detect low variance features, which can serve as proxies for high variance regions, without explicitly modelling low variance outputs. Where described in some examples herein as a low variance detection (or region) informing a high variance detection, such examples are meant to be inclusive of multiple networks (e.g., in which a low variance network output is used to provide additional context to a high variance detector network), single networks trained to determine regions of low variance (e.g., having losses associated therewith which are based at least in part on variance in the input region) and couple to regions of general detections (e.g., by coupling detection losses with variance-based losses), and/or any combination thereof, etc.

At operation 1110, the perception system 322 can analyze the third output to determine whether a high variance region is present in the image data. That is, in at least one example, the perception system 322 can analyze the third output to determine whether the image data is associated with indication(s) and/or information indicative that a high variance region was detected. The perception system 322 can provide the image data to other system(s) of the vehicle 302 for controlling operation of the vehicle 302, as described above with reference to FIGS. 3 and 9.

Of course, though depicted in FIG. 11 as distinct operations, operations 1104, 1106, and/or 1108 may be combined into a single machine learned model (or network) whereby features are shared between the subnetworks, wherein an output of one is input into another, whereby the outputs comprise separate low variance regions of a network, or the like.

Figure 6:
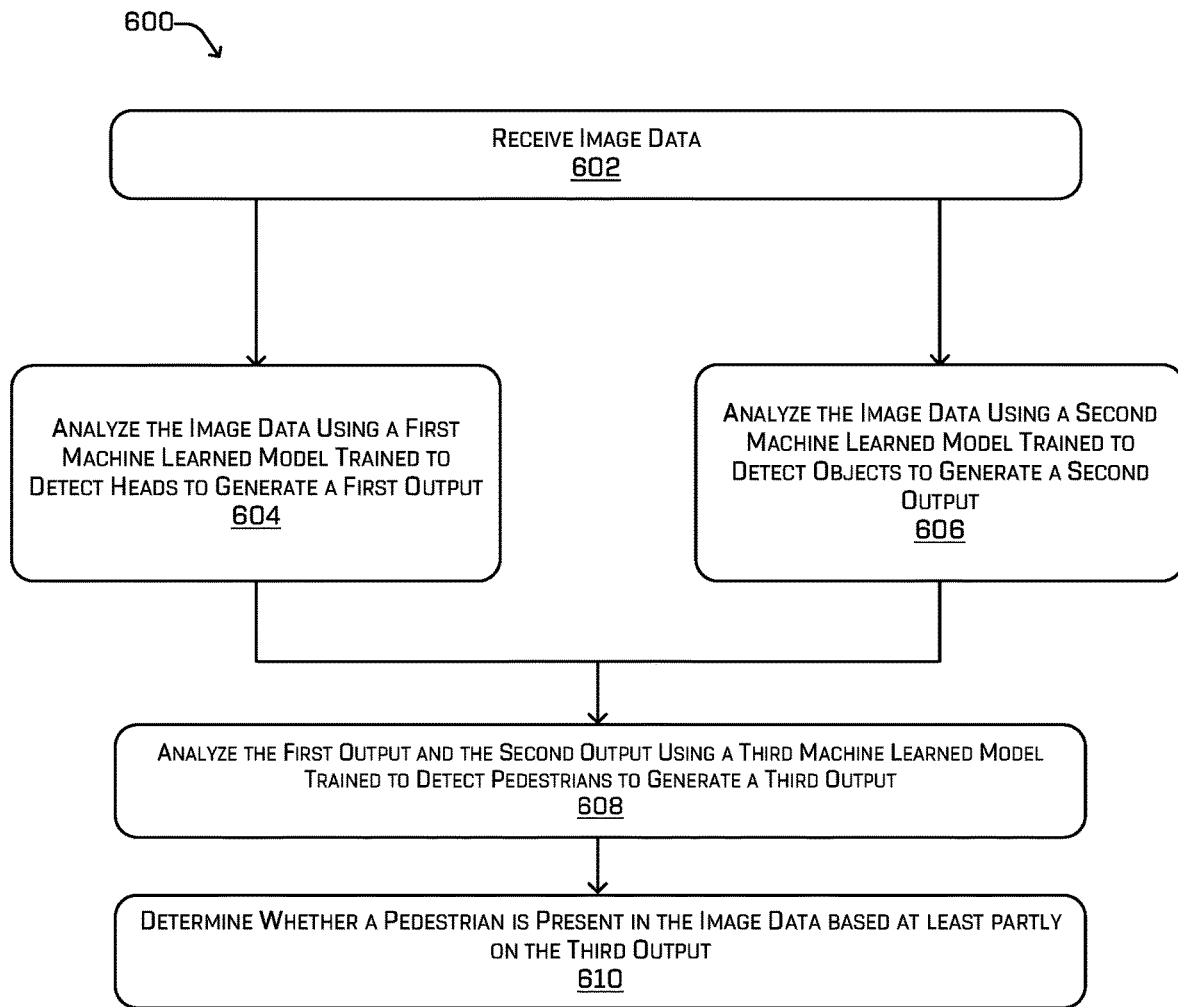
FIG. 6 illustrates another example process for determining whether a pedestrian is present in image data associated with an environment using machine learned models, as described herein.

FIG. 6 illustrates another example process 600 for determining whether a pedestrian is present in image data associated with an environment using machine learned models, as described herein.

At operation 602, the perception system 322 receives image data, as described above at operation 402.

At operation 604, the perception system 322 analyzes the image data using a first machine learned model trained to detect heads to generate a first output. As described above with reference to FIG. 3 and also above at operation 404 of FIG. 4, the perception system 322 can perform object detection, segmentation, and/or classification based at least in part on sensor data received from the sensor system(s) 306. In at least one example, the perception system 322 can receive the image data and can utilize one or more image processing algorithms to perform object detection, segmentation, and/or classification with respect to object(s) identified in the image data. In at least one example, the perception system 322 can perform head detection using a head detector 102. As described above, in at least one example, the head detector 102 can utilize a neural network for detecting head(s) in the image data.

As described above, in at least one example, the head detector 102 can generate an output (e.g., a "first output" as used here, in FIG. 6), which can include the image data associated with an indication of whether a head was detected by the head detector 102. In some examples, the indication can be a bounding box that surrounds a region of interest corresponding to a head in the image data. In other examples, any other type of indication can be used to indicate whether a head was detected by the head detector 102. In at least one example, the indication(s) can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a head was detected (e.g., a binary indication (i.e., head detected (H) or not (N)), a probability, etc.), etc. In at least one example, the perception system 322 can analyze the output to determine whether the image data is associated with indication(s) and/or information indicative that a head was detected.

At operation 606, the perception system 322 analyzes the image data using a second machine learned model trained to detect objects to generate a second output. As described above, the perception system 322 can perform object detection, segmentation, and/or classification based at least in part on sensor data received from the sensor system(s) 306 of the vehicle 302. In at least one example, the perception system 322 can utilize a machine learned model trained to detect and/or classify objects in the image data (e.g., an object detector). Such a machine learned model can be trained by the training system 340 described above with reference to FIG. 3. In at least one example, the perception system 322 can output an intermediate output of features detected by the machine learned model that are used to detect and/or classify objects in image data. For the purpose of the discussion process 600, the intermediate output of features can be referred to as the "second output." In at least one example, the first output and the second output can be output at or near the same time. That is, in such an example, the first machine learned model and the second machine learned model can analyze the image data at the same time and/or in parallel.

At operation 608, the perception system 322 can analyze the first output and the second output using a third machine learned model trained to detect pedestrians to generate a third output. In at least one example, the first output and the second output can be input into a machine learned model for detecting pedestrians, which can be utilized by the pedestrian detector 112. In such an example, the pedestrian detector 112 can analyze the first output and the second output to generate a third output. The third output can include one or more indications that are associated with regions of interest corresponding to identified pedestrians in the environment within which the vehicle 302 is positioned. In some examples, an indication can be a bounding box that surrounds a region of interest corresponding to a pedestrian in the image data. In other examples, any other type of indication can be used to indicate that a pedestrian was detected in the environment by the pedestrian detector 112. In at least one example, the indication can be associated with information including an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (e.g., height (h), width (w), etc.), etc.

At operation 610, the perception system 322 can analyze the third output to determine whether a pedestrian is present in the image data. That is, in at least one example, the perception system 322 can analyze the third output to determine whether the image data is associated with indication(s) and/or information indicative that a pedestrian was detected. The perception system 322 can provide the image data to other system(s) of the vehicle 302 for controlling operation of the vehicle 302, as described above with reference to FIGS. 3 and 4.

Of course, though depicted in FIG. 6 as distinct operations, operations 604, 606, and/or 608 may be combined into a single machine learned model (or network) whereby features are shared between the subnetworks, wherein an output of one is input into another, whereby the outputs comprise separate heads of a network, or the like.

FIGS. 6 and 11 are examples of processes where the indication of the high variance region (e.g., pedestrian) can be determined independent of an indication of a low variance region (e.g., head). That is, in some examples, the second detector 812 can determine an indication of a high variance region (e.g., pedestrian) based on the sensor data, or a portion thereof, and without the indication of the low variance region (e.g., head). In an example, the first machine learned model may not detect a low variance region (e.g., head) but the second machine learned model may generate an output that can be used by the third machine learned model to detect an indication of a high variance region (e.g., pedestrian). In an additional example, the third machine learned model can utilize outputs of both the first and second machine learned model, as described above.

Figure 12:
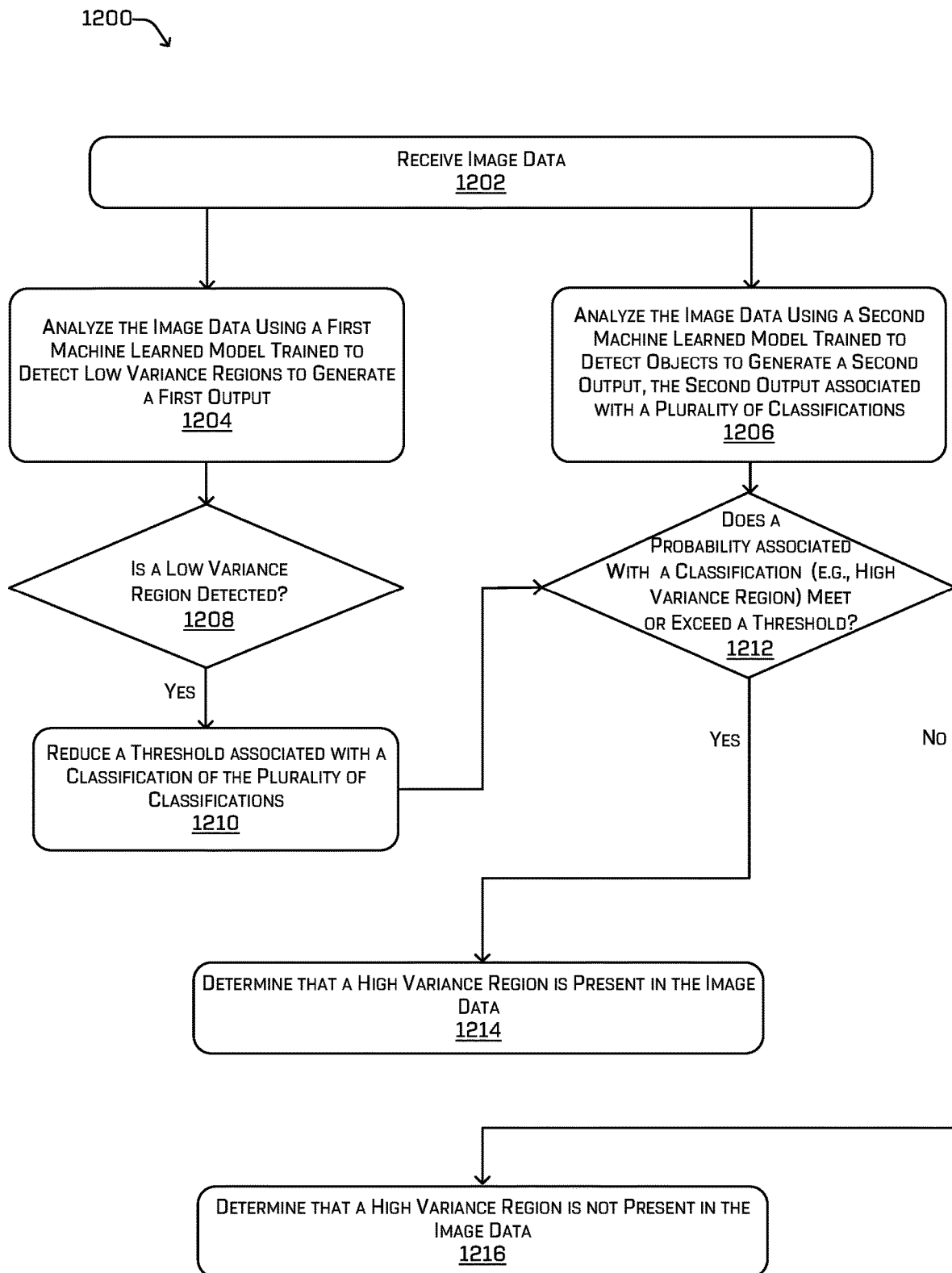
FIG. 12 illustrates yet another example process for determining whether a high variance region is present in image data associated with an environment using machine learned models, as described herein.

FIG. 12 illustrates yet another example process 1200 for determining whether a high variance region is present in image data associated with an environment using machine learned models, as described herein.

At operation 1202, the perception system 322 receives image data, as described above at operation 902.

At operation 1204, the perception system 322 analyzes the image data using a first machine learned model trained to detect low variance regions to generate a first output. As described above with reference to FIG. 3 and also at operation 904 of FIG. 9, the perception system 322 can perform object detection, segmentation, and/or classification based at least in part on sensor data received from the sensor system(s) 306. In at least one example, the perception system 322 can receive the image data and can utilize one or more image processing algorithms to perform object detection, segmentation, and/or classification with respect to object(s) identified in the image data. In at least one example, the perception system 322 can perform low variance region detection using a first detector 802, as described above with reference to FIG. 8. As described above, in at least one example, the first detector 802 can utilize a neural network for detecting low variance region(s) associated with the image data.

As described above, in at least one example, the first detector 802 can generate an output (e.g., a "first output" as used here, in FIG. 12), which can include the image data associated with an indication of whether a low variance region was detected by the first detector 802. In some examples, the indication can be a bounding box that surrounds a region of interest corresponding to a low variance region associated with the image data. In other examples, any other type of indication can be used to indicate whether a low variance region was detected by the first detector 802. In at least one example, the indication(s) can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a low variance region was detected (e.g., a binary indication (i.e., low variance region detected (H) or not (N)), a probability, etc.), etc. In at least one example, the perception system 322 can analyze the output to determine whether the image data is associated with indication(s) and/or information indicative that a low variance region was detected.

As described above, for the purpose of this discussion, the use of the term "first output" can refer to information generated by analyzing the image data using the first machine learned model. In some examples, the term "first output" can refer to information that is explicitly modeled. However, in other examples, the term "first output" can refer to any indication and/or information generated by analyzing the image data, including but not limited to an intermediary output associated with individual layers of the first machine learned model. In some examples, a "first output" can be associated with an indication of a low variance region, which can be in the image data or associated with the image data. In examples where the indication of the low variance region is associated with the image data, such an indication can be derived from the image data and/or can be output via some portion of the first machine learned model.

At operation 1206, the perception system 322 analyzes the image data using a second machine learned model trained to detect objects to generate a second output, the second output associated with a plurality of classifications. As described above with reference to FIG. 3 and also at operation 1106 of FIG. 11, the perception system 322 can perform object detection, segmentation, and/or classification based at least in part on sensor data received from the sensor system(s) 306 of the vehicle 302. In at least one example, the perception system 322 can utilize a machine learned model trained to detect and/or classify objects in the image data. Such a machine learned model can be trained by the training system 340 described above with reference to FIG. 3. In at least one example, for an object identified in the image data, the machine learned model can output a plurality of classifications associated with the object. For example, the machine learned model can be a multi-class classifier that is trained, via a machine learning mechanism, to output a probability that an object is associated with individual classes of the multi-class classifier. In some examples, the classifications can be ranked from highest probability to lowest probability, and systems of the vehicle 302 can use the ranked classifications for determining (i) an object type associated with the object and/or (ii) how to control the vehicle 302. For the purpose of the discussion of process 1200, the plurality of classifications can be referred to as the "second output."

In at least one example, the first output and the second output can be output at or near the same time. That is, in such an example, the first machine learned model and the second machine learned model can analyze the image data at the same time and/or in parallel.

At operation 1208, the perception system 322 determines whether a low variance region is detected in association with the image data. In at least one example, the perception system 322 can analyze the first output of the first machine learned model to determine whether a low variance region is detected in association with the image data. As described above with reference to operation 406 of FIG. 4, if a low variance region is not detected, the first detector 802 can associate information with the image data indicating that a low variance region was not detected. However, if a low variance region is detected, the first detector 802 can associate an indication (e.g., a bounding box) with a region of interest of the image data corresponding to the low variance region. In at least one example, the perception system 322 can analyze the first output to determine whether the image data is associated with indication(s) and/or information indicative that a low variance region was detected.

At operation 1210, the perception system 322 reduces a threshold associated with a classification of the plurality of classifications. In at least one example, each classification of the plurality of classifications can be associated with a threshold that is configurable. In at least one example, the threshold can be set to a value such that if a probability (certainty or, inversely, an uncertainty) associated with a classification meets or exceeds the threshold, the perception system 322 can determine that an object is associated with the classification. In at least one example, responsive to determining that a low variance region was detected in the image data, the perception system 322 can reduce a threshold associated with a high variance region classification associated with the low variance region. That is, if a low variance region is detected in the image data, it is more likely that an object associated with a high variance region that is associated with the low variance region than if a low variance region is not detected in the image data. As such, the threshold associated with a classification indicating that an object is a high variance region need not be as high as when low variance region detection techniques are not used. As such, the perception system 322 can reduce the threshold associated with a high variance region classification.

At operation 1212, the perception system 322 determines whether a probability associated with a classification (e.g., high variance region) meets or exceeds a threshold. In at least one example, the perception system 322 can compare the probability associated with the high variance region classification to the threshold associated with the high variance region classification to determine whether the probability meets or exceeds the threshold. Based at least in part on determining that the probability meets or exceeds the threshold, the perception system 322 can determine that a high variance region is present in the image data, as illustrated at operation 1214. Based at least in part on determining that the probability does not meet or exceed the threshold, the perception system 322 can determine that a high variance region is not present in the image data, as illustrated at operation 1216. The perception system 322 can provide the image data to other system(s) of the vehicle 302 for controlling operation of the vehicle 302, as described above with reference to FIGS. 3 and 4.

Figure 7:
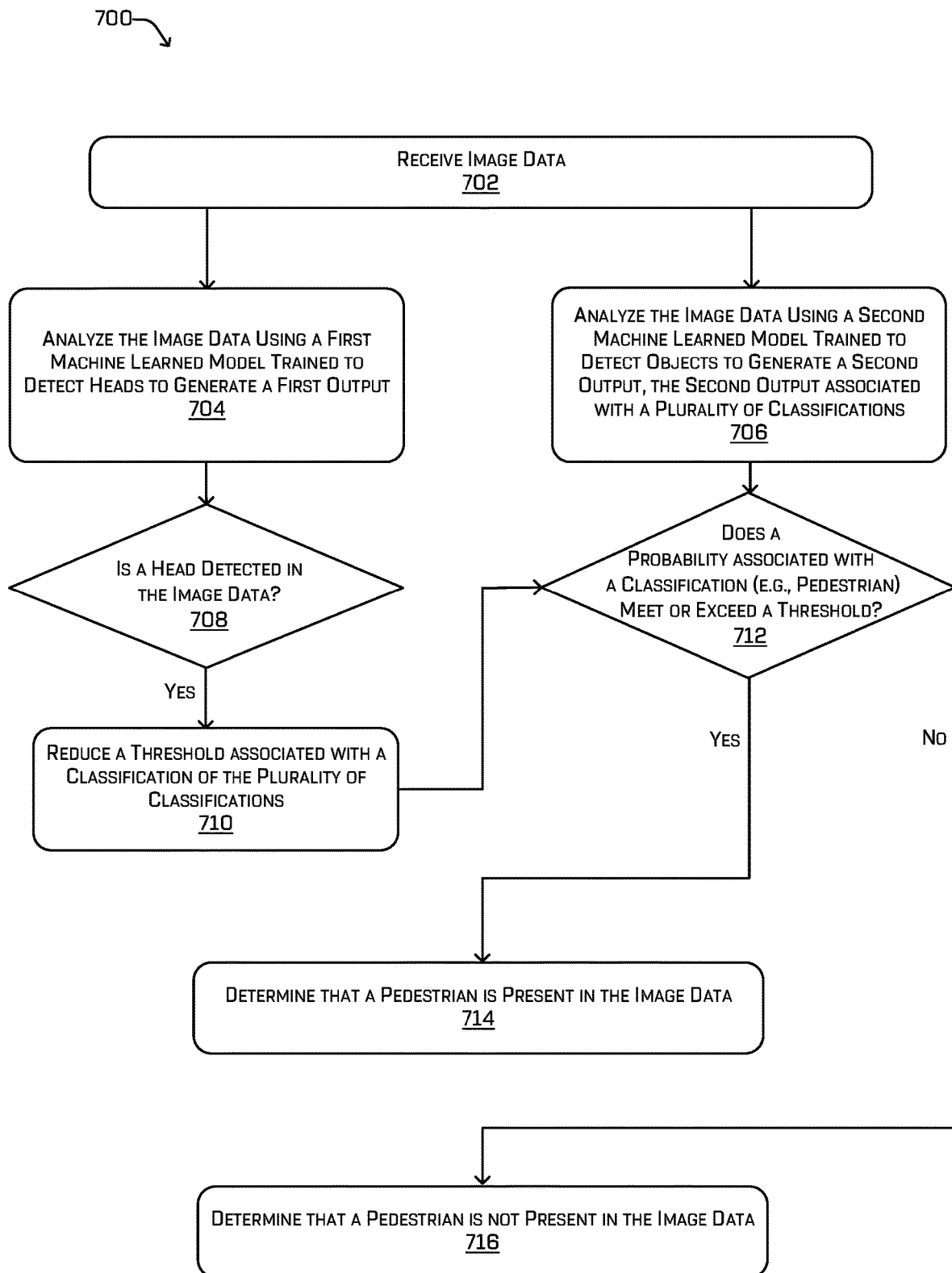
FIG. 7 illustrates yet another example process for determining whether a pedestrian is present in image data associated with an environment using machine learned models, as described herein.

FIG. 7 illustrates yet another example process 700 for determining whether a pedestrian is present in image data associated with an environment using machine learned models, as described herein.

At operation 702, the perception system 322 receives image data, as described above at operation 402.

At operation 704, the perception system 322 analyzes the image data using a first machine learned model trained to detect heads to generate a first output. As described above with reference to FIG. 3 and also at operation 404 of FIG. 4, the perception system 322 can perform object detection, segmentation, and/or classification based at least in part on sensor data received from the sensor system(s) 306. In at least one example, the perception system 322 can receive the image data and can utilize one or more image processing algorithms to perform object detection, segmentation, and/or classification with respect to object(s) identified in the image data. In at least one example, the perception system 322 can perform head detection using a head detector 102. As described above, in at least one example, the head detector 102 can utilize a neural network for detecting head(s) in the image data.

As described above, in at least one example, the head detector 102 can generate an output (e.g., a "first output" as used here, in FIG. 7), which can include the image data associated with an indication of whether a head was detected by the head detector 102. In some examples, the indication can be a bounding box that surrounds a region of interest corresponding to a head in the image data. In other examples, any other type of indication can be used to indicate whether a head was detected by the head detector 102. In at least one example, the indication(s) can be associated with information including an x-position (global and/or local position), a y-position (global and/or local position), a z-position (global and/or local position), an orientation (e.g., a roll, pitch, yaw), an extent of the object (e.g., height (h), width (w), etc.), an indication of whether a head was detected (e.g., a binary indication (i.e., head detected (H) or not (N)), a probability, etc.), etc. In at least one example, the perception system 322 can analyze the output to determine whether the image data is associated with indication(s) and/or information indicative that a head was detected.

At operation 706, the perception system 322 analyzes the image data using a second machine learned model trained to detect objects to generate a second output, the second output associated with a plurality of classifications. As described above with reference to FIG. 3 and also at operation 606 of FIG. 6, the perception system 322 can perform object detection, segmentation, and/or classification based at least in part on sensor data received from the sensor system(s) 306 of the vehicle 302. In at least one example, the perception system 322 can utilize a machine learned model trained to detect and/or classify objects in the image data. Such a machine learned model can be trained by the training system 340 described above with reference to FIG. 3. In at least one example, for an object identified in the image data, the machine learned model can output a plurality of classifications associated with the object. For example, the machine learned model can be a multi-class classifier that is trained, via a machine learning mechanism, to output a probability that an object is associated with individual classes of the multi-class classifier. In some examples, the classifications can be ranked from highest probability to lowest probability, and systems of the vehicle 302 can use the ranked classifications for determining (i) an object type associated with the object and/or (ii) how to control the vehicle 302. For the purpose of the discussion of process 700, the plurality of classifications can be referred to as the "second output." In at least one example, the first output and the second output can be output at or near the same time. That is, in such an example, the first machine learned model and the second machine learned model can analyze the image data at the same time and/or in parallel.

At operation 708, the perception system 322 determines whether a head is detected in the image data. In at least one example, the perception system 322 can analyze the first output of the first machine learned model to determine whether a head is detected in the image data. As described above with reference to operation 406 of FIG. 4, if a head is not detected in the image data, the head detector 102 can associate information with the image data indicating that a head was not detected. However, if a head is detected, the head detector 102 can associate an indication (e.g., a bounding box) with a region of interest of the image data corresponding to the head. In at least one example, the perception system 322 can analyze the first output to determine whether the image data is associated with indication(s) and/or information indicative that a head was detected.

At operation 710, the perception system 322 reduces a threshold associated with a classification of the plurality of classifications. In at least one example, each classification of the plurality of classifications can be associated with a threshold that is configurable. In at least one example, the threshold can be set to a value such that if a probability (certainty or, inversely, an uncertainty) associated with a classification meets or exceeds the threshold, the perception system 322 can determine that an object is associated with the classification. In at least one example, responsive to determining that a head was detected in the image data, the perception system 322 can reduce a threshold associated with a pedestrian classification. That is, if a head is detected in the image data, it is more likely that an object is a pedestrian than if a head is not detected in the image data. As such, the threshold associated with a classification indicating that an object is a pedestrian need not be as high as when head detection techniques are not used. As such, the perception system 322 can reduce the threshold associated with a pedestrian classification.

At operation 712, the perception system 322 determines whether a probability associated with a classification (e.g., pedestrian) meets or exceeds a threshold. In at least one example, the perception system 322 can compare the probability associated with the pedestrian classification to the threshold associated with the pedestrian classification to determine whether the probability meets or exceeds the threshold. Based at least in part on determining that the probability meets or exceeds the threshold, the perception system 322 can determine that a pedestrian is present in the image data, as illustrated at operation 714. Based at least in part on determining that the probability does not meet or exceed the threshold, the perception system 322 can determine that a pedestrian is not present in the image data, as illustrated at operation 716. The perception system 322 can provide the image data to other system(s) of the vehicle 302 for controlling operation of the vehicle 302, as described above with reference to FIGS. 3 and 4.

Figure 13:
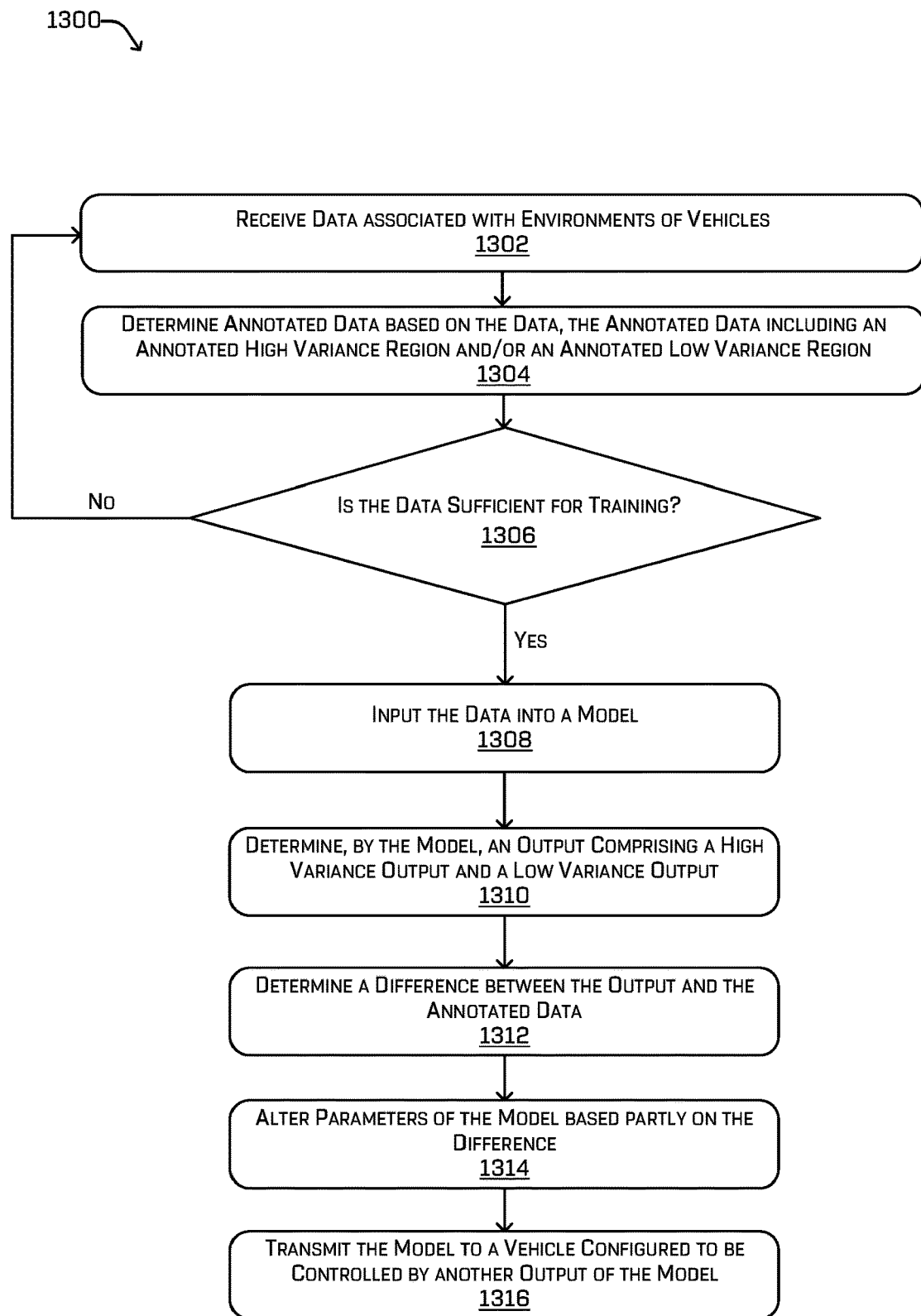
FIG. 13 illustrates an example process for training a model to detect high variance region(s) and/or low variance region(s).

FIG. 13 illustrates an example process 1300 for training a model to detect high variance region(s) and/or low variance region(s).

Block 1302 illustrates receiving data associated with environments of vehicles. As described above, in at least one example, the computing device(s) 334 can receive the sensor data (raw or processed) from the vehicle 302 and/or other data collection devices (which can include other vehicles like 302), as well as data from one or more third party sources and/or systems. For example, individual vehicles, such as the vehicle 302, can include sensor systems. As described above with reference to FIG. 3, the sensor system(s) 306 can include LIDAR sensors, RADAR sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), ToF sensors, etc. The sensor system(s) 306 can include multiple instances of each of these or other types of sensors. In at least one example, the sensor system(s) 306 can send sensor data, via the network(s) 332, to the computing device(s) 334 at a particular frequency, after a lapse of a predetermined period of time, in near real-time, etc. In some examples, the data can be image data, a batch of image data, or an image space. As described above, the data can additionally or alternatively comprise data from other sensors of the sensor system(s) 306.

Block 1304 illustrates determining annotated data based on the data, the annotated data including an annotated high variance region and/or an annotated low variance region. In at least one example, the training system 340 can annotate regions of the data and/or receive annotated data. Such data can comprise training data.

In some examples, the training system 340 can annotate regions of the data using one or more statistical models. As described above, in some examples, the training data can include images tagged, or otherwise annotated, to indicate where a high variance region is located. In other examples, high variance regions may not be tagged or otherwise annotated. As described above, a high variance region is a region where multiple instances of the region (e.g., regions classified with a same bounding box) in input data (e.g., image data, a batch of image data, an input space) are compared, a variance metric associated with the multiple instances of the region can meet or exceed a threshold. Such a variance metric can represent information inside of a bounding box associated with a region. In some examples, the variance metric can be based on entropy, pixel intensity, aspect ratios between boxes, and the like.

As described above, in some examples, the training data can include images tagged, or otherwise annotated, to indicate where a low variance region is located. As described above, a low variance region is a region where multiple instances of the region (e.g., regions classified with a same bounding box) in input data (e.g., image data, a batch of image data, an input space) are compared, a variance metric associated with the multiple instances of the region is below a threshold. Such a variance metric can represent information inside of a bounding box associated with a region. In some examples, the variance metric can be based on entropy, pixel intensity, aspect ratios between boxes, and the like.

In some examples, the high variance region and/or low variance region can be determined based at least in part on a feature associated with the data. For example, in some examples, the training system 340 can train, using machine learning, a model for detecting high variance regions, based on low variance features. In such examples, the low variance outputs may not be explicitly modeled, but instead, a model can be trained to detect high variance regions based at least in part on implicit low variance regions. In an example, input data (e.g., image data) can be projected (e.g., via a neural network) into a feature space that represents the input data. Such feature space includes high-level information for object detection. That is, when a higher variance region or input data is be projected into a lower dimensional space, the result can be a space having a lower variance. Such a result can be tagged as, or otherwise indicated to be, a low variance region. In an example, another neural network can be used to reconstruct the input data (e.g., image data) based on features in the feature space. That is, the features can be projected into an image space (e.g., using a neural network). In at least one example, the training system 340 can perform such projection and re-projection to determine high variance and/or low variance regions.

Block 1306 illustrates determining whether the data is sufficient for training. In at least one example, the more training data available for training a model, the more accurate the model is likely to be. As such, the training system 340 can determine whether there is enough training data to train the model. In some examples, the training system 340 can compare the amount of data and/or the quality of data to one or more thresholds and, if the training data satisfies the threshold(s), can determine that the data is sufficient for training the model. If the data is not sufficient, process 1300 can return to block 1302.

Block 1308 illustrates inputting the data into a model. In at least one example, the training system 340 can input the data into a model. The model can determine an output, as illustrated at block 1310, wherein the output comprises a high variance output and a low variance output. In at least one example, the training system 340 can train a model such that the trained model is configured to output an indication of a low variance region and an indication of a high variance region based at least in part on an input. In some examples, the training system 340 can train multiple models to perform detection operations as described herein. As described above, machine trained models described herein may comprise separate networks, may comprise different aspects of a common network, or may otherwise comprise a combination of multiple networks. In any of the examples provided herein, any of the machine learned models may be trained end-to-end, jointly, disjointly, or the like. In such examples where the models are trained end-to-end or jointly, common features may be leveraged by one network to improve outputs of the other.

In at least one example, the training system 340 can train the machine learned model(s) (e.g., "model" of FIG. 13) independently and, in some examples, using pre-informed of relationships between low variance regions and high variance regions. In some examples, the machine learned model(s) can be trained end-to-end. When trained end-to-end, such training may enforce the coupling between low variance regions which inform the ultimate output. In some examples, training such a machine learned model to detect a low variance region may comprise evaluating and back-propagating based at least in part on a loss function which determines a measure of the variance of an associated region in the input space.

Block 1312 illustrates determining a difference between the output and the annotated data. In at least one example, the training system 340 can determine a difference between the output and the annotated data.

As described above, in some examples, the training system 340 can train, using machine learning, a model for detecting high variance regions, based on low variance features. In some examples, such training can be done by modelling an end-to-end optimization problem. In such examples, the low variance outputs may not be explicitly modeled, but instead, a model can be trained to detect high variance regions based at least in part on implicit low variance regions. In an example, input data (e.g., image data) can be projected (e.g., via a neural network) into a feature space that represents the input data. Such feature space includes high-level information for object detection. In an example, another neural network can be used to reconstruct the input data (e.g., image data) based on features in the feature space. That is, the features can be projected into an image space (e.g., using a neural network). In at least one example, a loss function can be employed to enforce consistency between the input data and the reconstructed input data. That is, a loss function can determine a difference between the output and the annotated data and can be employed by the training system 340 to train the model to focus on low variance features for detecting high variance regions (e.g., explicitly modelling high variance regions). In at least one example, the training system 340 can thus alter parameters of the model based partly on the difference, as illustrated at block 1314.

Block 1316 illustrates transmitting the model to a vehicle configured to be controlled by another output of the model. In at least one example, the trained model can be used by the perception system 322 and/or the detector(s) (e.g., the first detector 802 and/or the second detector 804) to detect high variance regions and/or low variance regions in image data, as described above. As described above, in some examples, a high variance region can correspond to a pedestrian and a low variance region can correspond to a head, or portion thereof.

Example Clauses

A. A method comprising: receiving, from an image capturing device on a vehicle, image data representing an environment; inputting, into a machine learned model, at least a portion of the image data; receiving, from the machine learned model, an indication of a head represented in the image data, the indication of the head comprising a first bounding box; determining, based at least partly on the indication of the head, that a pedestrian is present in the environment; determining, based at least partly on the indication of the head, an indication of the pedestrian, the indication of the pedestrian comprising a second bounding box; providing the indication of the pedestrian to at least one of a planning component or a prediction component of the vehicle for determining a trajectory along which the vehicle is to travel; and controlling the vehicle based at least partly on the trajectory.

B. The method as paragraph A recites, wherein determining the indication of the pedestrian comprises: performing a statistical analysis of the indication of the head and an associated portion of the image data that is proximate to the head; and determining, based at least partly on the statistical analysis and the associated portion of the image data that is proximate to the head, a position and extents of the indication of the pedestrian.

C. The method as paragraph A or B recites, wherein the machine learned model comprises a first machine learned model and the indication of the head comprises a first output, and wherein determining the indication of the pedestrian comprises: inputting the first output into a second machine learned model; receiving, from the second machine learned model, the indication of the pedestrian, wherein the second machine learned model is trained to detect pedestrians in image data.

D. The method as any of claims A-C recites, wherein the machine learned model comprises a first machine learned model and the indication of the head comprises a first output, and wherein determining the indication of the pedestrian comprises: receiving, based at least partly on analyzing the image data using a second machine learned model, a second output indicating at least one feature of the pedestrian; inputting the first output and the second output into a third machine learned model, wherein the third machine learned model is trained to detect pedestrians in image data; and receiving, from the third machine learned model, the indication of the pedestrian.

E. The method as any of claims A-D recites, wherein the machine learned model comprises a first machine learned model and the indication of the head comprises a first output, the method further comprising: receiving, based at least partly on analyzing the image data using a second machine learned model, a second output indicating a plurality of classifications of an object identified in the image data and a plurality of confidence scores, an individual confidence score corresponding to an individual classification; reducing, based at least partly on the first output, a threshold associated with a pedestrian classification of the plurality of classifications; determining that a confidence score associated with the pedestrian classification meets or exceeds the threshold; and determining that the pedestrian is present in the environment based at least partly on determining that the confidence score meets or exceeds the threshold.

F. The method as any of claims A-E recites, further comprising determining information associated with the pedestrian, wherein the information comprises at least one of an x-position of the pedestrian, a y-position of the pedestrian, a z-position of the pedestrian, an orientation of the pedestrian, or an extent of the pedestrian.

G. A system comprising: one or more processors; and computer-readable instructions that, when executed by the one or more processors, cause the one or more processors to perform operations comprising: receiving, from a sensor associated with the system, sensor data representing an environment; inputting, into a machine learned model, at least a portion of the sensor data; receiving, from the machine learned model, an indication of a head represented in the sensor data; determining an indication of the pedestrian based at least partly on the indication of the head; determining, based at least partly on the indication of the head or the indication of the pedestrian, that a pedestrian is present in the environment; and providing the indication of the pedestrian to a component of the system for controlling the system.

H. The system as paragraph G recites, wherein the machine learned model is a first machine learned model that outputs a first output including the indication of the head and information associated with the head, wherein the information comprises at least one of an x-position of the head, a y-position of the head, a z-position of the head, an orientation of the head, or an extent of the head.

I. The system as paragraph H recites, wherein determining the indication of the pedestrian comprises: inputting the first output into a second machine learned model; receiving, from the second machine learned model, the indication of the pedestrian, wherein the second machine learned model is trained to detect pedestrians in image data.

J. The system as paragraph H or I recites, wherein determining the indication of the pedestrian comprises: receiving, based at least partly on analyzing the sensor data using a second machine learned model, a second output indicating at least one feature of the pedestrian; inputting the first output and the second output into a third machine learned model, wherein the third machine learned model is trained to detect pedestrians in sensor data; and receiving, from the third machine learned model, the indication of the pedestrian.

K. The system as any of claims H-J recites, the operations further comprising: receiving, based at least partly on analyzing the sensor data using a second machine learned model, a second output indicating a plurality of classifications of an object identified in the sensor data and a plurality of confidence scores, an individual confidence score corresponding to an individual classification; reducing, based at least partly on the first output, a threshold associated with a pedestrian classification of the plurality of classifications; determining that a confidence score associated with the pedestrian classification meets or exceeds the threshold; and determining that the pedestrian is present in the environment based at least partly on determining that the confidence score meets or exceeds the threshold.

L. The system as any of claims G-K recites, wherein the indication of the pedestrian is a bounding box that is determined based at least partly on one or more of an x-position of the pedestrian, a y-position of the pedestrian, a z-position of the pedestrian, an orientation of the pedestrian, or an extent of the pedestrian.

M. The system as any of claims G-L recites, wherein the sensor data is image data and detecting the head comprises detecting at least one of a front view of a face, a side view of a face, or a back of the head in the image data.

N. The system as any of claims G-M recites, wherein determining the indication of the pedestrian comprises: performing a statistical analysis of the indication of the head and an associated portion of the sensor data that is proximate to the head; and determining, based at least partly on the statistical analysis and the associated portion of the sensor data that is proximate to the head, a position and extents of the indication of the pedestrian, wherein the indication of the pedestrian is determined based at least partly on the indication of the head.

O. The system as any of claims G-N recites, wherein the system is a vehicle and the operations further comprise: providing the indication of the pedestrian to at least one of a planning component or a prediction component for determining a trajectory along which the vehicle is to travel; and controlling the vehicle based at least partly on the trajectory.

P. One or more computer-readable media that, when executed by one or more processors, cause the one or more processors to perform operations comprising: receiving, from a sensor associated with a vehicle, sensor data representing an environment within which the vehicle is located; inputting, into a machine learned model, at least a portion of the sensor data; receiving, from the machine learned model, an indication of a head represented in the sensor data; determining an indication of the pedestrian based at least partly on the indication of the head; determining, based at least partly on the indication of the head or the indication of the pedestrian, that a pedestrian is present in the environment; and providing the indication of the pedestrian to a component of the vehicle for controlling the vehicle.

Q. The one or more computer-readable media as paragraph P recites, wherein the machine learned model comprises a first machine learned model and the indication of the head comprises a first output, and wherein determining the indication of the pedestrian comprises: inputting the first output into a second machine learned model; receiving, from the second machine learned model, the indication of the pedestrian, wherein the second machine learned model is trained to detect pedestrians in image data.

R. The one or more computer-readable media as paragraph P or Q recites, wherein the machine learned model comprises a first machine learned model and the indication of the head comprises a first output, and wherein determining the indication of the pedestrian comprises: receiving, based at least partly on analyzing the sensor data using a second machine learned model, a second output indicating at least one feature of the pedestrian; inputting the first output and the second output into a third machine learned model, wherein the third machine learned model is trained to detect pedestrians in sensor data; and receiving, from the third machine learned model, the indication of the pedestrian.

S. The one or more computer-readable media as any of claims P-R recites, wherein the machine learned model comprises a first machine learned model and the indication of the head comprises a first output, the operations further comprising: receiving, based at least partly on analyzing the sensor data using a second machine learned model, a second output indicating a plurality of classifications of an object identified in the sensor data and a plurality of confidence scores, an individual confidence score corresponding to an individual classification; reducing, based at least partly on the first output, a threshold associated with a pedestrian classification of the plurality of classifications; determining that a confidence score associated with the pedestrian classification meets or exceeds the threshold; and determining that the pedestrian is present in the environment based at least partly on determining that the confidence score meets or exceeds the threshold.

T. The one or more computer-readable media as any of claims P-S recites, wherein determining the indication of the pedestrian comprises: performing a statistical analysis of the indication of the head and an associated portion of the sensor data that is proximate to the head; and determining, based at least partly on the statistical analysis and the associated portion of the sensor data that is proximate to the head, a position and extents of the indication of the pedestrian, wherein the indication of the head is associated with a first bounding box and the indication of the pedestrian is associated with a second bounding box.

U. A method comprising: receiving, from an image capturing device on a vehicle, image data representing an environment; inputting, into a machine learned model, at least a portion of the image data; receiving, from the machine learned model, an indication of a low variance region represented in the image data, the indication of the low variance region comprising a first bounding box; determining, based at least partly on the indication of the low variance region, that a high variance region is present in the environment; determining, based at least partly on the indication of the low variance region, an indication of the high variance region, the indication of the high variance region comprising a second bounding box; providing the indication of the high variance region to at least one of a planning component or a prediction component of the vehicle for determining a trajectory along which the vehicle is to travel; and controlling the vehicle based at least partly on the trajectory.

V. The method as paragraph U recites, wherein determining the indication of the high variance region comprises: performing a statistical analysis of the indication of the low variance region and an associated portion of the image data that is proximate to the low variance region; and determining, based at least partly on the statistical analysis and the associated portion of the image data that is proximate to the low variance region, a position and extents of the indication of the high variance region.

W. The method as paragraph U or V recites, wherein the machine learned model comprises a first machine learned model and the indication of the low variance region comprises a first output, and wherein determining the indication of the high variance region comprises: inputting the first output into a second machine learned model; receiving, from the second machine learned model, the indication of the high variance region, wherein the second machine learned model is trained to detect high variance regions in image data.

X. The method as any of claims U-W recites, wherein the machine learned model comprises a first machine learned model and the indication of the low variance region comprises a first output, and wherein determining the indication of the high variance region comprises: receiving, based at least partly on analyzing the image data using a second machine learned model, a second output indicating at least one feature of the high variance region; inputting the first output and the second output into a third machine learned model, wherein the third machine learned model is trained to detect high variance regions in image data; and receiving, from the third machine learned model, the indication of the high variance region.

Y. The method as any of claims U-X recites, wherein the machine learned model comprises a first machine learned model and the indication of the low variance region comprises a first output, the method further comprising: receiving, based at least partly on analyzing the image data using a second machine learned model, a second output indicating a plurality of classifications of an object identified in the image data and a plurality of confidence scores, an individual confidence score corresponding to an individual classification; reducing, based at least partly on the first output, a threshold associated with a high variance region classification of the plurality of classifications; determining that a confidence score associated with the high variance region classification meets or exceeds the threshold; and determining that the high variance region is present in the environment based at least partly on determining that the confidence score meets or exceeds the threshold.

Z. The method as any of claims U-Y recites, further comprising determining information associated with the high variance region, wherein the information comprises at least one of an x-position of the high variance region, a y-position of the high variance region, a z-position of the high variance region, an orientation of the high variance region, or an extent of the high variance region.

AA. A system comprising: one or more processors; and computer-readable instructions that, when executed by the one or more processors, cause the one or more processors to perform operations comprising: receiving, from a sensor associated with the system, sensor data representing an environment; inputting, into a machine learned model, at least a portion of the sensor data; receiving, from the machine learned model, an indication of a low variance region represented in the sensor data; determining an indication of the high variance region based at least partly on the indication of the low variance region; determining, based at least partly on the indication of the low variance region or the indication of the high variance region, that a high variance region is present in the environment; and providing the indication of the high variance region to a component of the system for controlling the system.

AB. The system as paragraph AA recites, wherein the machine learned model is a first machine learned model that outputs a first output including the indication of the low variance region and information associated with the low variance region, wherein the information comprises at least one of an x-position of the low variance region, a y-position of the low variance region, a z-position of the low variance region, an orientation of the low variance region, or an extent of the low variance region.

AC. The system as paragraph AB recites, wherein determining the indication of the high variance region comprises: inputting the first output into a second machine learned model; receiving, from the second machine learned model, the indication of the high variance region, wherein the second machine learned model is trained to detect high variance regions in image data.

AD. The system as paragraph AB or AC recites, wherein determining the indication of the high variance region comprises: receiving, based at least partly on analyzing the sensor data using a second machine learned model, a second output indicating at least one feature of the high variance region; inputting the first output and the second output into a third machine learned model, wherein the third machine learned model is trained to detect high variance regions in sensor data; and receiving, from the third machine learned model, the indication of the high variance region.

AE. The system as any of claims AB-AD recites, the operations further comprising: receiving, based at least partly on analyzing the sensor data using a second machine learned model, a second output indicating a plurality of classifications of an object identified in the sensor data and a plurality of confidence scores, an individual confidence score corresponding to an individual classification; reducing, based at least partly on the first output, a threshold associated with a high variance region classification of the plurality of classifications; determining that a confidence score associated with the high variance region classification meets or exceeds the threshold; and determining that the high variance region is present in the environment based at least partly on determining that the confidence score meets or exceeds the threshold.

AF. The system as any of claims AA-AE recites, wherein the indication of the high variance region is a bounding box that is determined based at least partly on one or more of an x-position of the high variance region, a y-position of the high variance region, a z-position of the high variance region, an orientation of the high variance region, or an extent of the high variance region.

AG. The system as any of claims AA-AF recites, wherein the sensor data is image data and detecting the low variance region comprises detecting at least one of a front view of a face, a side view of a face, or a back of the low variance region in the image data.

AH. The system as any of claims AA-AG recites, wherein determining the indication of the high variance region comprises: performing a statistical analysis of the indication of the low variance region and an associated portion of the sensor data that is proximate to the low variance region; and determining, based at least partly on the statistical analysis and the associated portion of the sensor data that is proximate to the low variance region, a position and extents of the indication of the high variance region, wherein the indication of the high variance region is determined based at least partly on the indication of the low variance region.

AI. The system as any of claims AA-AH recites, wherein the system is a vehicle and the operations further comprise: providing the indication of the high variance region to at least one of a planning component or a prediction component for determining a trajectory along which the vehicle is to travel; and controlling the vehicle based at least partly on the trajectory.

AJ. One or more computer-readable media that, when executed by one or more processors, cause the one or more processors to perform operations comprising: receiving, from a sensor associated with a vehicle, sensor data representing an environment within which the vehicle is located; inputting, into a machine learned model, at least a portion of the sensor data; receiving, from the machine learned model, an indication of a low variance region represented in the sensor data; determining an indication of the high variance region based at least partly on the indication of the low variance region; determining, based at least partly on the indication of the low variance region or the indication of the high variance region, that a high variance region is present in the environment; and providing the indication of the high variance region to a component of the vehicle for controlling the vehicle.

AK. The one or more computer-readable media as paragraph AJ recites, wherein the machine learned model comprises a first machine learned model and the indication of the low variance region comprises a first output, and wherein determining the indication of the high variance region comprises: inputting the first output into a second machine learned model; receiving, from the second machine learned model, the indication of the high variance region, wherein the second machine learned model is trained to detect high variance regions in image data.

AL. The one or more computer-readable media as paragraph AJ or AK recites, wherein the machine learned model comprises a first machine learned model and the indication of the low variance region comprises a first output, and wherein determining the indication of the high variance region comprises: receiving, based at least partly on analyzing the sensor data using a second machine learned model, a second output indicating at least one feature of the high variance region; inputting the first output and the second output into a third machine learned model, wherein the third machine learned model is trained to detect high variance regions in sensor data; and receiving, from the third machine learned model, the indication of the high variance region.

AM. The one or more computer-readable media as any of claims AJ-AL recites, wherein the machine learned model comprises a first machine learned model and the indication of the low variance region comprises a first output, the operations further comprising: receiving, based at least partly on analyzing the sensor data using a second machine learned model, a second output indicating a plurality of classifications of an object identified in the sensor data and a plurality of confidence scores, an individual confidence score corresponding to an individual classification; reducing, based at least partly on the first output, a threshold associated with a high variance region classification of the plurality of classifications; determining that a confidence score associated with the high variance region classification meets or exceeds the threshold; and determining that the high variance region is present in the environment based at least partly on determining that the confidence score meets or exceeds the threshold.

AN. The one or more computer-readable media as any of claims AJ-AM recites, wherein determining the indication of the high variance region comprises: performing a statistical analysis of the indication of the low variance region and an associated portion of the sensor data that is proximate to the low variance region; and determining, based at least partly on the statistical analysis and the associated portion of the sensor data that is proximate to the low variance region, a position and extents of the indication of the high variance region, wherein the indication of the low variance region is associated with a first bounding box and the indication of the high variance region is associated with a second bounding box.

AO. A method comprising: receiving, from an image capturing device associated with a vehicle, image data representing an environment; inputting at least a portion of the image data into a machine learned model; determining, by the machine learned model, an indication of a low variance region associated with the image data; determining, based at least partly on the indication of the low variance region, an indication of a high variance region in the image data represented by a bounding box; providing the bounding box to at least one of a planning component or a prediction component of the vehicle for determining a trajectory along which the vehicle is to travel; and controlling the vehicle based at least partly on the trajectory.

AP. The method as paragraph AO recites, wherein determining the indication of the high variance region comprises: performing a statistical analysis of the indication of the low variance region and an associated portion of the image data that is proximate to the low variance region; and determining, based at least partly on the statistical analysis and the associated portion of the image data that is proximate to the low variance region, a position and extents of the high variance region.

AQ. The method as paragraph AO or AP recites, wherein the machine learned model comprises a first machine learned model and the indication of the low variance region comprises a first output, and wherein determining the indication of the high variance region comprises: inputting the first output into a second machine learned model; and receiving, from the second machine learned model, the bounding box, wherein the second machine learned model is trained to detect high variance regions in image data.

AR. The method as any of paragraphs AO-AQ recites, wherein the machine learned model comprises a first machine learned model and the indication of the low variance region comprises a first output, and wherein determining the indication of the high variance region comprises: determining, based at least partly on analyzing the image data using a second machine learned model, a second output indicating at least one feature of the high variance region; and inputting the first output and the second output into a third machine learned model, wherein the third machine learned model is trained to determine high variance regions in image data.

AS. The method as any of paragraphs AO-AR recites, further comprising: receiving, based at least partly on the image data, a plurality of classifications of an object identified in the image data and a plurality of confidence scores, an individual confidence score corresponding to an individual classification; reducing, based at least partly on the indication of the low variance region, a threshold associated with a classification of the plurality of classifications, wherein the classification corresponds to a high variation region; determining that a confidence score associated with the classification meets or exceeds the threshold; and determining the indication of the high variance region based at least partly on determining that the confidence score meets or exceeds the threshold.

AT. A system comprising: one or more processors; and computer-readable instructions that, when executed by the one or more processors, cause the one or more processors to perform operations comprising: receiving sensor data representing an environment; determining an indication of a low variance region associated with the sensor data; determining an indication of a high variance region associated with the sensor data based at least in part on the indication of the low variance region; and controlling the system based on at least one of the sensor data or the indication of the high variance region.

AU. The system as paragraph AT recites, the operations further comprising: determining an additional indication of a high variance region associated with the sensor data; and controlling the system further based at least in part on the additional indication of the high variance region.

AV. The system as paragraph AU recites, the operations further comprising: determining, based at least in part on the indication of the high variance region and the additional indication of the high variance region, a combined indication of the high variance region; and controlling the system further based at least in part on the combined indication of the high variance region.

AW. The system as any of paragraphs AT-AV recites, wherein the indication of the low variance region is one or more of represented in the sensor data or derived from the sensor data.

AX. The system as any of paragraphs AT-AW recites, wherein: the determining the indication of the low variance region is based at least in part on analyzing at least a portion of the sensor data using a neural network, the low variance region comprises a representation of a face in the sensor data, and the high variance region comprises a representation of a pedestrian in the sensor data.

AY. The system as paragraph AX recites, wherein the neural network is trained based at least in part on utilizing another neural network to project features associated with input data into an image space to generate reconstructed input data and enforcing consistency between the input data and the reconstructed input data using a loss function.

AZ. The system as any of paragraphs AT-AY recites, wherein determining the indication of the high variance region comprises: inputting the indication of a low variance region into a portion of a machine learned model trained to detect high variance regions in sensor data; and analyzing the indication of the low variance region by the portion of the machine learned model.

BA. The system as any of paragraphs AT-AZ recites, the operations further comprising: receiving a plurality of classifications of an object identified in the sensor data and a plurality of confidence scores, an individual confidence score corresponding to an individual classification; reducing a threshold associated with a classification of the plurality of classifications associated with the high variance region; determining that a confidence score associated with the classification meets or exceeds the threshold; and determining the indication of the high variance region based at least partly on determining that the confidence score meets or exceeds the threshold.

BB. The system as paragraph BA recites, wherein reducing the threshold associated with the classification is based at least in part on determining the indication of the low variance region.

BC. The system as any of paragraphs AT-BB recites, wherein the indication of the high variance region comprises a bounding box.

BD. One or more computer-readable media that, when executed by one or more processors, cause the one or more processors to perform operations comprising: receiving, from a sensor associated with a vehicle, sensor data representing an environment within which the vehicle is located; inputting, into a machine learned model, at least a portion of the sensor data; determining, by the machine learned model, an indication of a low variance region associated with the sensor data; and determining an indication of a high variance region based at least in part on a portion of the sensor data associated with the low variance region.

BE. The one or more computer-readable media as paragraph BD recites, the operations further comprising determining the indication of the high variance region based at least in part on the indication of the low variance region associated with the portion of the sensor data.

BF. The one or more computer-readable media as paragraph BD or BE recites, the operations further comprising determining the indication of the high variance region based at least in part on analyzing at least the portion of the sensor data using at least one of another machine learned model or another portion of the machine learned model.

BG. The one or more computer-readable media as any of paragraphs BD-BF recites, the operations further comprising: providing the indication of the high variance region to at least one of a planning component or a prediction component for determining a trajectory along which the vehicle is to travel; and controlling the vehicle based at least partly on the trajectory.

BH. The one or more computer-readable media as any of paragraphs BD-BG recites, wherein: the sensor data is image data; the low variance region is associated with at least one of a front view of a face, a side view of a face, or a back of a face in the image data; and the high variance region is associated with a pedestrian.

BI. A method comprising: receiving data associated with environments of vehicles; determining annotated data based at least in part on the data, wherein the annotated data comprises an annotated high variance region in the data and an annotated low variance region in the data; inputting the data into a model; determining, by the model, an output comprising a high variance output and a low variance output; determining a difference between the output and the annotated data; altering parameters of the model based at least in part on the difference; and transmitting the model to a vehicle configured to be controlled by another output of the model.

BJ. The method as paragraph BI recites, wherein the annotated low variance region is determined from one or more statistical models.

BK. The method as paragraph BI or BJ recites, wherein the low variance region is determined based at least in part on a feature associated with the data.

BL. The method as paragraph BK recites, the method further comprising: inputting the feature into an additional model; receiving, from the additional model, a reconstructed output; and determining a loss based on a difference between the reconstructed output and the data, wherein altering the one or more parameters is further based at least in part on the loss.

BM. The method as any of paragraphs BI-BL recites, wherein: the model is a neural network, and the high variance output is based on the low variance output, the method further comprising determining an additional high variance output, and further wherein altering the one or more parameters comprises training the model end-to-end based at least in part on the low variance output, the high variance output, and the additional high variance output.

BN. The method as any of paragraphs BI-BM recites, wherein the low variance output comprises head detection and the high variance output comprises a pedestrian detection.

BO. The method as any of paragraphs BI-BN recites, wherein the data comprises image data, a batch of image data, or an image space.

BP. A system comprising: one or more processors; and one or more non-transitory computer-readable media that, when executed by the one or more processors, cause the system to perform operations comprising: receiving sensor data from a sensor associated with environments of vehicles; annotating, as annotated data and based on the sensor data, an annotated low variance region associated with the sensor data; training a model based at least in part on the annotated data and the sensor data to generate a trained model, the trained model configured to output an indication of a low variance region and an indication of a high variance region based at least in part on an input; and transmitting the trained model to a vehicle configured to be controlled by another output of the model.

BQ. The system as paragraph BP recites, wherein the sensor data comprises at least one of image data, a batch of image data, or an image space.

BR. The system as paragraph BQ recites, wherein the annotated low variance region is associated with a feature of the sensor data determined by the model.

BS. The system as paragraph BR recites, the operations further comprising: mapping the feature to a reconstructed input; and determining, as a loss, a difference between the sensor data and the reconstructed input, wherein training the model is further based at least in part on the loss.

BT. The system as paragraph BS recites, wherein mapping the feature to reconstructed input comprises: inputting the feature into an additional model; and receiving, from the additional model, the reconstructed input.

BU. The system as paragraph BS or BT recites, wherein the indication of the high variance region is based at least in part on the indication of the low variance region, and wherein training the model comprises training the model from end to end.

BV. The system as any of paragraphs BP-BU recites, wherein the annotated low variance region is determined from one or more statistical models based at least in part on one or more of entropy, pixel intensity, or aspect ratios associated with indications of low variance regions.

BW. One or more non-transitory computer-readable media that, when executed by one or more processors, cause the one or more processors to perform operations comprising: determining, based on sensor data received from a sensor associated with a vehicle, annotated data, wherein the annotated data comprises one or more of an annotated low variance region or an annotated high variance region; inputting the sensor data into a model; determining, by the model, an output comprising a high variance output and a low variance output; determining a difference between the annotated data and the output; altering one or more parameters associated with the model based at least in part on the difference; and transmitting the model to a vehicle configured to be controlled by another output of the model.

BX. The one or more non-transitory computer-readable media as paragraph BW recites, wherein determining the annotated data comprises determining the annotated low variance region based at least in part on a statistical model associated with one or more of the sensor data or an intermediary output of the model based at least in part on the sensor data.

BY. The one or more non-transitory computer-readable media as paragraph BW or BX recites, the operations further comprising: inputting at least a portion of the sensor data into the model; receiving, as a set of features, an intermediate output of the model; inputting the set of features into one or more of an additional model or a portion of the model; receiving, from the one or more of additional model or portion of the model, a reconstructed input; and determining a second difference between the reconstructed output and the portion of the sensor data, wherein determining the annotated data comprises determining, using a statistical model, the low variance region associated with the set of features.

BZ. The one or more non-transitory computer-readable media as paragraph BY recites, wherein altering the one or more parameters is further based at least in part on the second difference.

CA. The one or more non-transitory computer-readable media as paragraph BY or BZ recites, wherein: the model is a neural network, and the high variance output is based on the low variance output, the operations further comprising determining an additional high variance output, and further wherein altering the one or more parameters comprises training the model end-to-end based at least in part on the low variance output, the high variance output, and the additional high variance output.

CB. The one or more non-transitory computer-readable media as any of paragraphs BX-CA recites, wherein the low variance output comprises head detection and the high variance output comprises a pedestrian detection. While the example clauses described above are described with respect to one particular implementation, it should be understood that, in the context of this document, the content of the example clauses can also be implemented via a method, device, system, a computer-readable medium, and/or another implementation. Additionally, any of examples A-CB may be implemented alone or in combination with any other one or more of the examples A-CB.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   receiving, from an image capturing device associated with a vehicle, image data representing an environment;
   inputting at least a portion of the image data into a machine learned model;
   determining, by the machine learned model, an indication of a position of a low variance region associated with the image data;
   determining, based at least partly on the indication of the position of the low variance region, an indication of a high variance region in the image data represented by a bounding box, the low variance region being a sub-region of the high variance region;
   determining, based at least in part on the bounding box, a trajectory; and
   controlling the vehicle based at least partly on the trajectory.

2. The method as claim 1 recites, wherein determining the indication of the high variance region comprises:
   performing a statistical analysis of the indication of the low variance region and an associated portion of the image data that is proximate to the low variance region; and
   determining, based at least partly on the statistical analysis and the associated portion of the image data that is proximate to the low variance region, a location and extents of the high variance region.

3. The method as claim 1 recites, wherein the machine learned model comprises a first machine learned model and the indication of the position of the low variance region comprises a first output, and
   wherein determining the indication of the high variance region comprises:
      inputting the first output into a second machine learned model; and
      receiving, from the second machine learned model, the bounding box,
         wherein the second machine learned model is trained to detect high variance regions in image data.

4. The method as claim 1 recites, wherein the machine learned model comprises a first machine learned model and the indication of the position of the low variance region comprises a first output, and
   wherein determining the indication of the high variance region comprises:
      determining, based at least partly on analyzing the image data using a second machine learned model, a second output indicating at least one feature of the high variance region; and
      inputting the first output and the second output into a third machine learned model, wherein the third machine learned model is trained to determine high variance regions in image data.

5. The method as claim 1 recites, further comprising:
   receiving, based at least partly on the image data, a plurality of classifications of an object identified in the image data and a plurality of confidence scores, an individual confidence score corresponding to an individual classification;
   reducing, based at least partly on the indication of the position of the low variance region, a threshold associated with a classification of the plurality of classifications, wherein the classification corresponds to a high variation region;
   determining that a confidence score associated with the classification meets or exceeds the threshold; and
   determining the indication of the high variance region based at least partly on determining that the confidence score meets or exceeds the threshold.

6. A system comprising:
   one or more processors; and
   computer-readable instructions that, when executed by the one or more processors, cause the one or more processors to perform operations comprising:
      receiving sensor data representing an environment;
      determining an indication of a position of a low variance region associated with the sensor data;
      determining an indication of a high variance region associated with the sensor data based at least in part on the indication of the position of the low variance region, the low variance region being a sub-region of the high variance region; and
      controlling the system based on at least one of the sensor data or the indication of the high variance region.

7. The system as claim 6 recites, the operations further comprising:
   determining an additional indication of a high variance region associated with the sensor data; and
   controlling the system further based at least in part on the additional indication of the high variance region.

8. The system as claim 7 recites, the operations further comprising:
   determining, based at least in part on the indication of the high variance region and the additional indication of the high variance region, a combined indication of the high variance region; and
   controlling the system further based at least in part on the combined indication of the high variance region.

9. The system as claim 6 recites, wherein the indication of the position of the low variance region is one or more of represented in the sensor data or derived from the sensor data.

10. The system as claim 6 recites, wherein:
   the determining the indication of the position of the low variance region is based at least in part on analyzing at least a portion of the sensor data using a neural network,
   the low variance region comprises a representation of a face in the sensor data, and
   the high variance region comprises a representation of a pedestrian in the sensor data.

11. The system as claim 10 recites, wherein the neural network is trained based at least in part on utilizing another neural network to project features associated with input data into an image space to generate reconstructed input data and enforcing consistency between the input data and the reconstructed input data using a loss function.

12. The system as claim 6 recites, wherein determining the indication of the high variance region comprises:

inputting the indication of the position of a low variance region into a portion of a machine learned model trained to detect high variance regions in sensor data; and analyzing the indication of the position of the low variance region by the portion of the machine learned model.

13. The system as claim 6 recites, the operations further comprising:

receiving a plurality of classifications of an object identified in the sensor data and a plurality of confidence scores, an individual confidence score corresponding to an individual classification;

reducing a threshold associated with a classification of the plurality of classifications associated with the high variance region;

determining that a confidence score associated with the classification meets or exceeds the threshold; and determining the indication of the high variance region based at least partly on determining that the confidence score meets or exceeds the threshold.

14. The system as claim 13 recites, wherein reducing the threshold associated with the classification is based at least in part on determining the indication of the position of the low variance region.

15. The system as claim 6 recites, wherein the indication of the high variance region comprises a bounding box.

16. One or more computer-readable media that, when executed by one or more processors, cause the one or more processors to perform operations comprising:

receiving, from a sensor associated with a vehicle, sensor data representing an environment within which the vehicle is located;

inputting, into a machine learned model, at least a portion of the sensor data;

determining, by the machine learned model, an indication of a low variance region associated with the sensor data, wherein the low variance region indicates at least a portion of an object that varies from object to object, within a same object classification, at or below a threshold variance; and determining an indication of a high variance region based at least in part on a portion of the sensor data associated with the low variance region, the low variance region being a sub-region of the high variance region.

17. The one or more computer-readable media as claim 16 recites, the operations further comprising determining the indication of the high variance region based at least in part on the indication of the low variance region associated with the portion of the sensor data.

18. The one or more computer-readable media as claim 16 recites, the operations further comprising determining the indication of the high variance region based at least in part on analyzing at least the portion of the sensor data using at least one of another machine learned model or another portion of the machine learned model.

19. The one or more computer-readable media as claim 16 recites, the operations further comprising:

determining, based at least in part on the indication of the high variance region, a trajectory along which the vehicle is to travel; and controlling the vehicle based at least partly on the trajectory.

20. The one or more computer-readable media as claim 16 recites, wherein:

the sensor data is image data;

the low variance region is associated with at least one of a front view of a face, a side view of a face, or a back of a face in the image data; and the high variance region is associated with a pedestrian.

* * * * *